United States Patent [19]

Pederson et al.

[11] 4,017,683
[45] Apr. 12, 1977

[54] DIGITAL MULTIPLEXING SYSTEM EMPLOYING REMOTE SCANNING OF A PLURALITY OF MONITORING POINTS

[75] Inventors: Carl N. Pederson, Westmont; Peter G. Angelopoulos, Elmhurst, both of Ill.

[73] Assignee: Johnson Service Company, Milwaukee, Wis.

[22] Filed: June 25, 1975

[21] Appl. No.: 590,311

Related U.S. Application Data

[62] Division of Ser. No. 419,714, Nov. 28, 1973, Pat. No. 3,938,144.

[52] U.S. Cl. .............................. 178/69.1; 340/413; 179/15 BS
[51] Int. Cl.² ........................................ H04L 7/04
[58] Field of Search ................. 178/50, 53, 53.1 R, 178/58, 68, 69.5 R; 179/2 DP; 340/150, 345, 354, 413

[56] References Cited

UNITED STATES PATENTS

| 3,430,204 | 2/1969 | Milford | 178/69.5 R X |
| 3,636,257 | 1/1972 | Dixon | 178/58 R |
| 3,715,507 | 2/1973 | Oshima et al. | 178/58 R |

*Primary Examiner*—Benedict V. Safourek
*Attorney, Agent, or Firm*—Johnson, Dienner, Emrich & Wagner

[57] ABSTRACT

A digital start-stop multiplexing system including a sender which sequentially scans a plurality of monitoring points and generates a train of digital pulses coded to represent information provided at the monitoring points for transmission over a transmission line to a receiver which is responsive to the digital pulse to automatically synchronize itself with the sender, store the data pulses and provide indications of conditions indicated at the monitoring points. The receiver also monitors the transmission line and detects and displays open or short circuit conditions of the transmission line. Coded pulses may also be transmitted from the receiver location to the remote sender over the same transmission line during stop portions of the primary signal.

12 Claims, 21 Drawing Figures

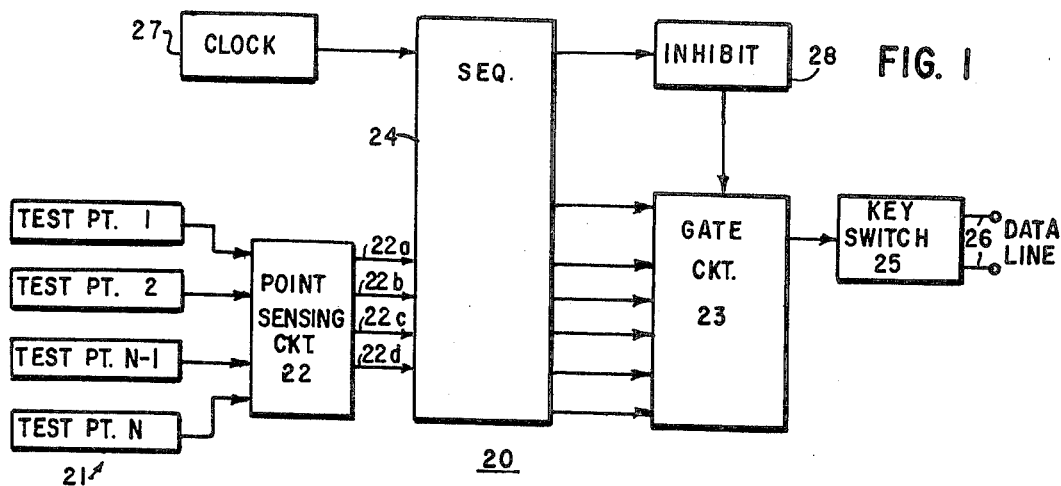
FIG. 1
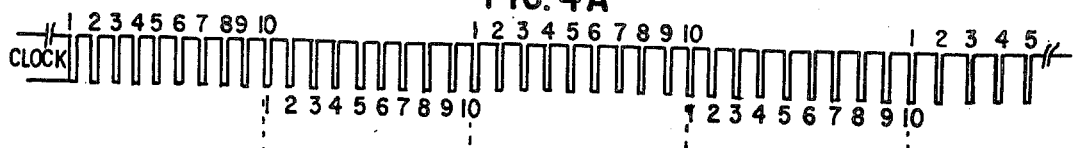
FIG. 4A
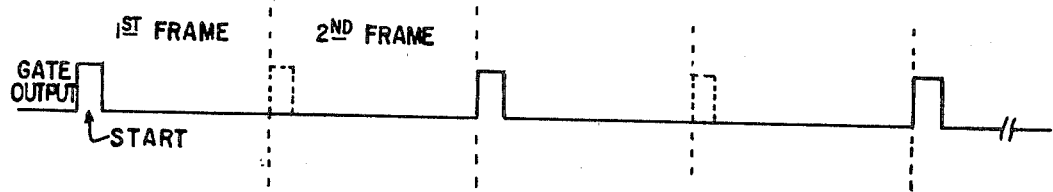
FIG. 4B
FIG. 4C
FIG. 4D
FIG. 4E

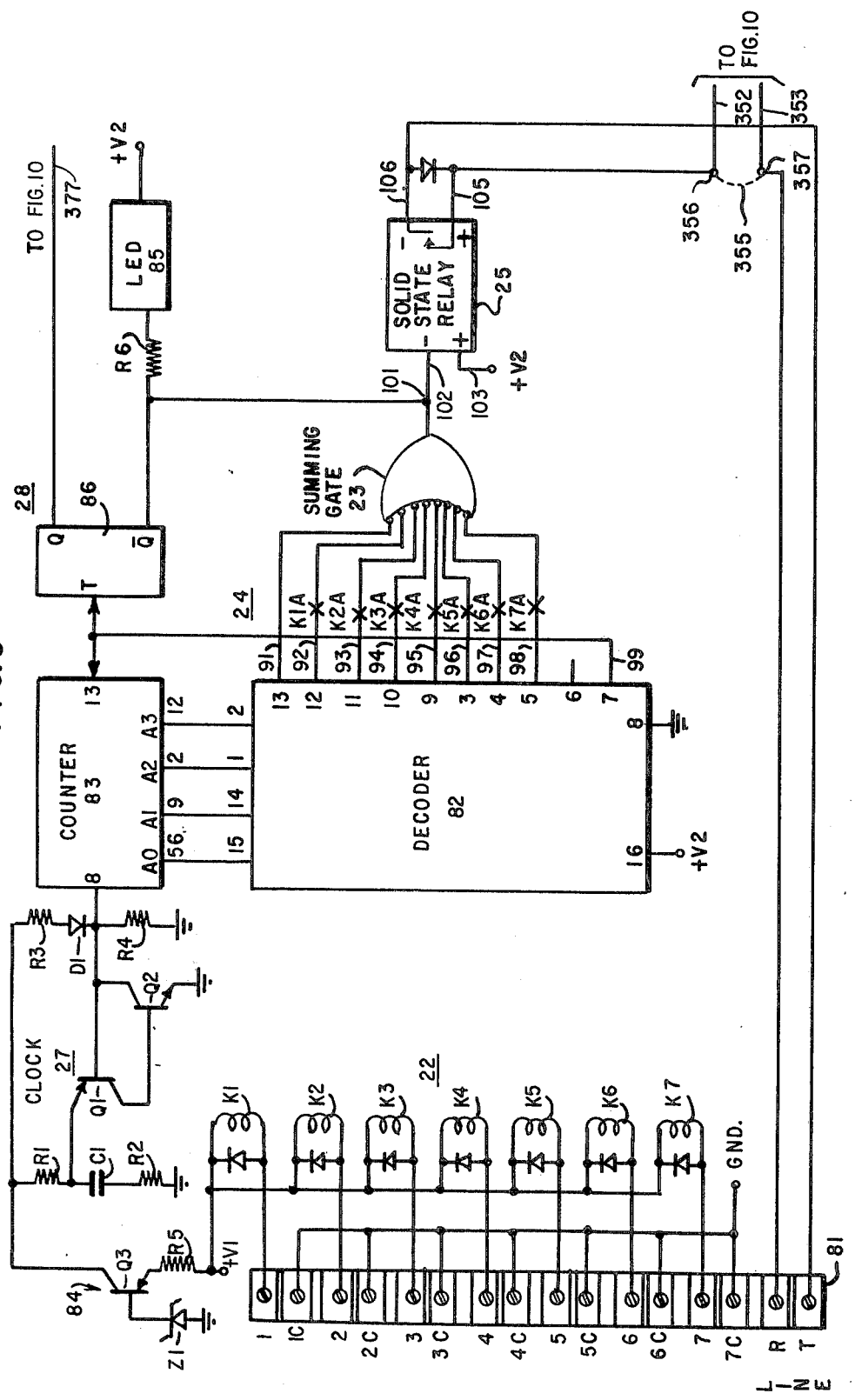

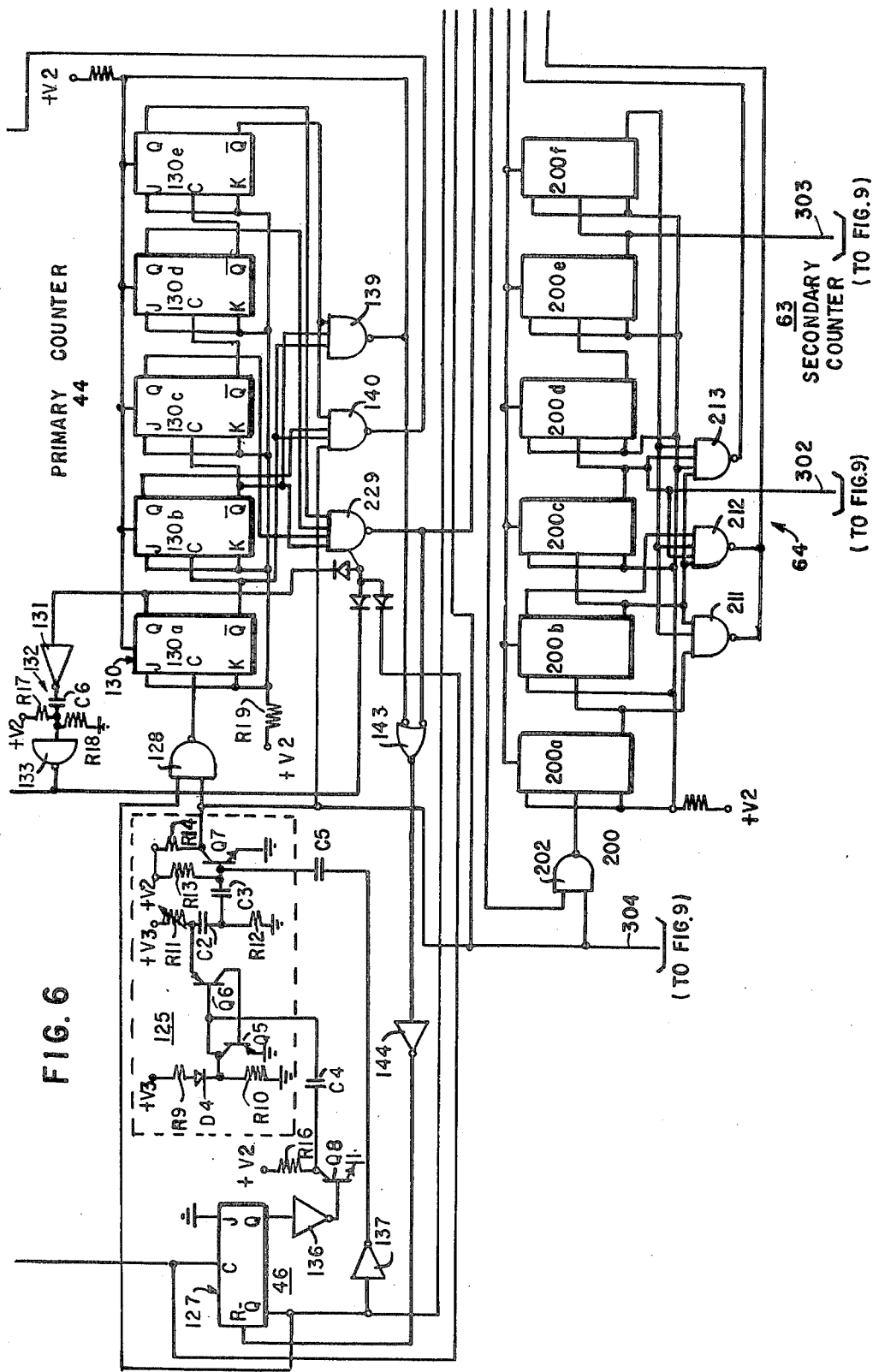

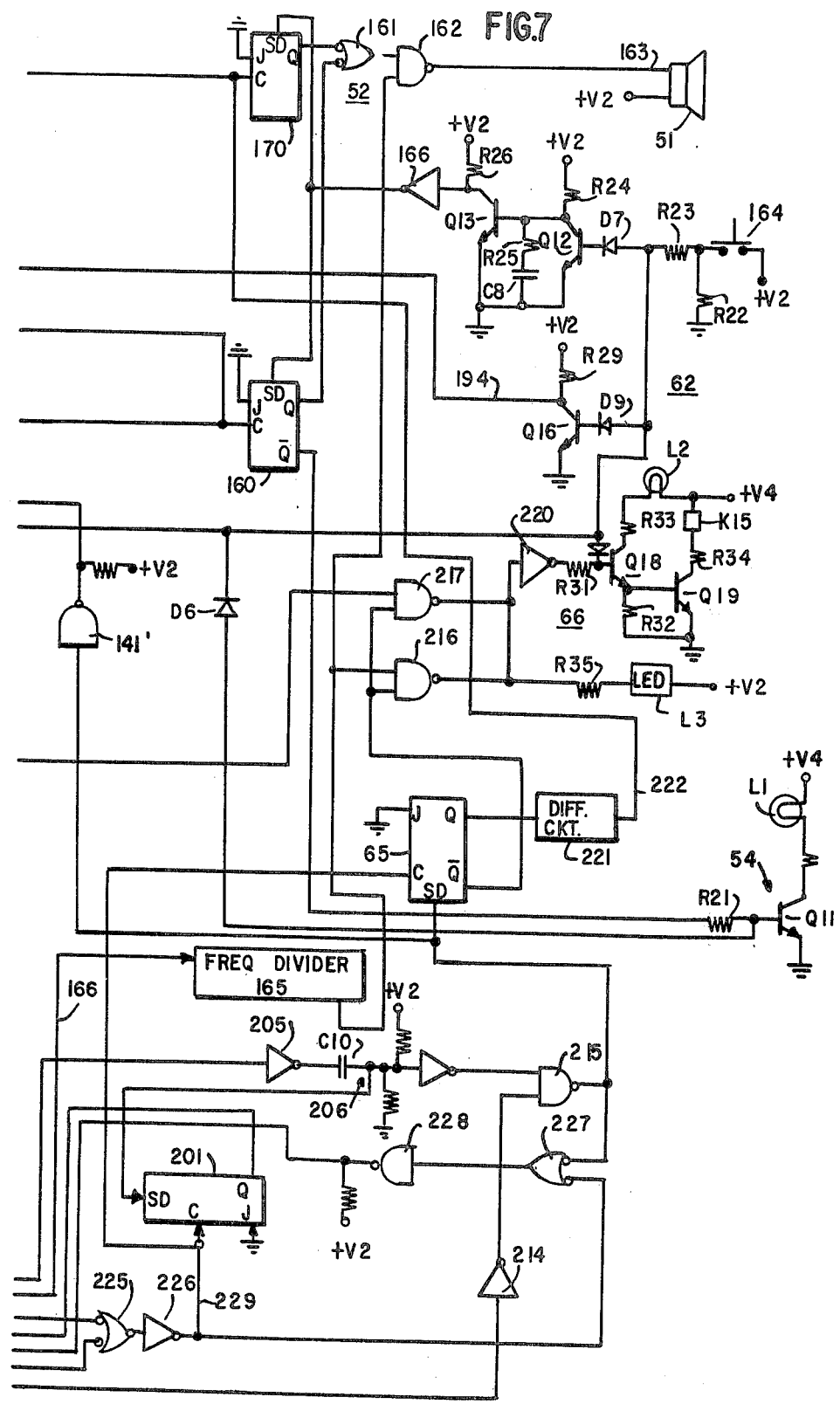

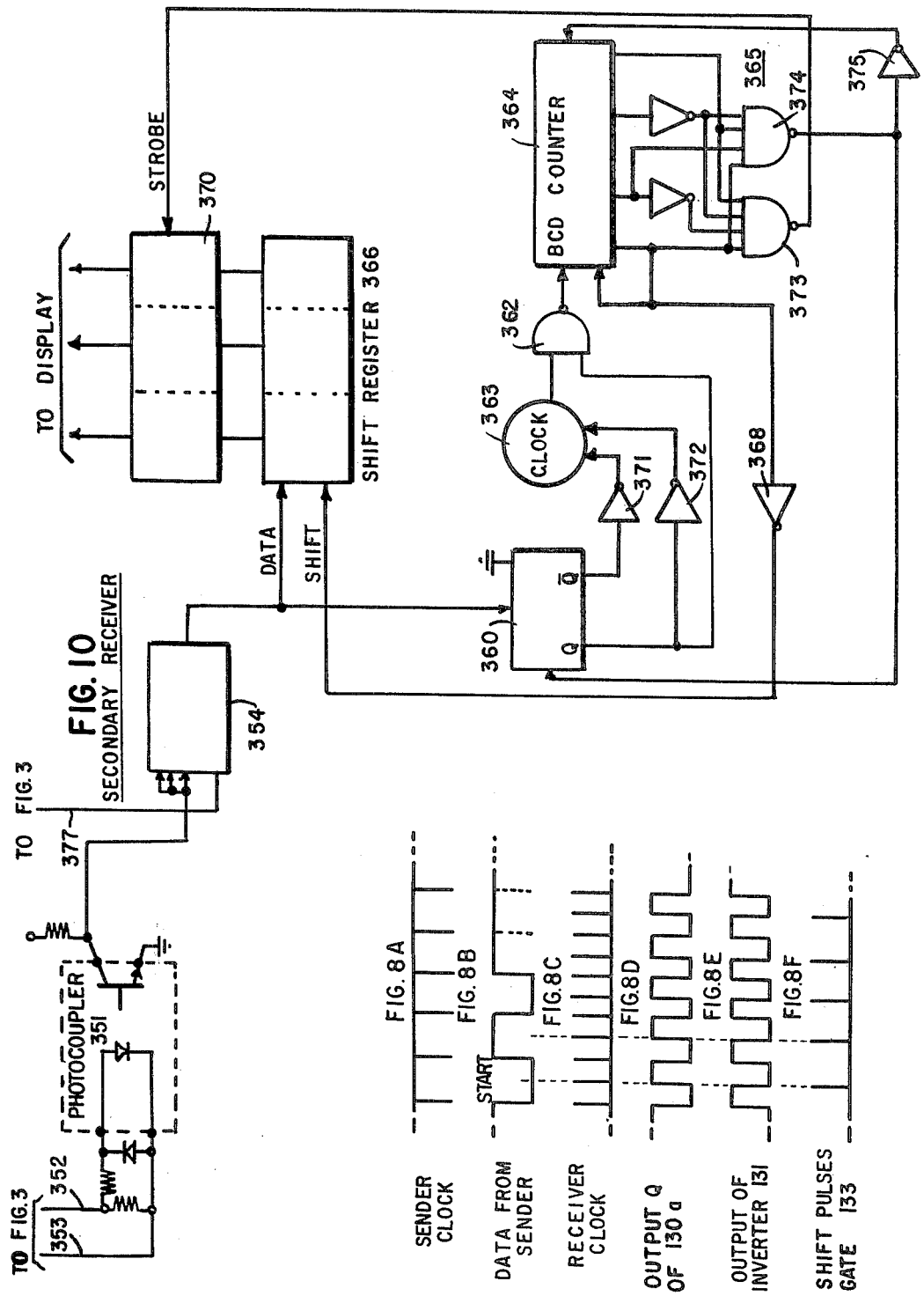

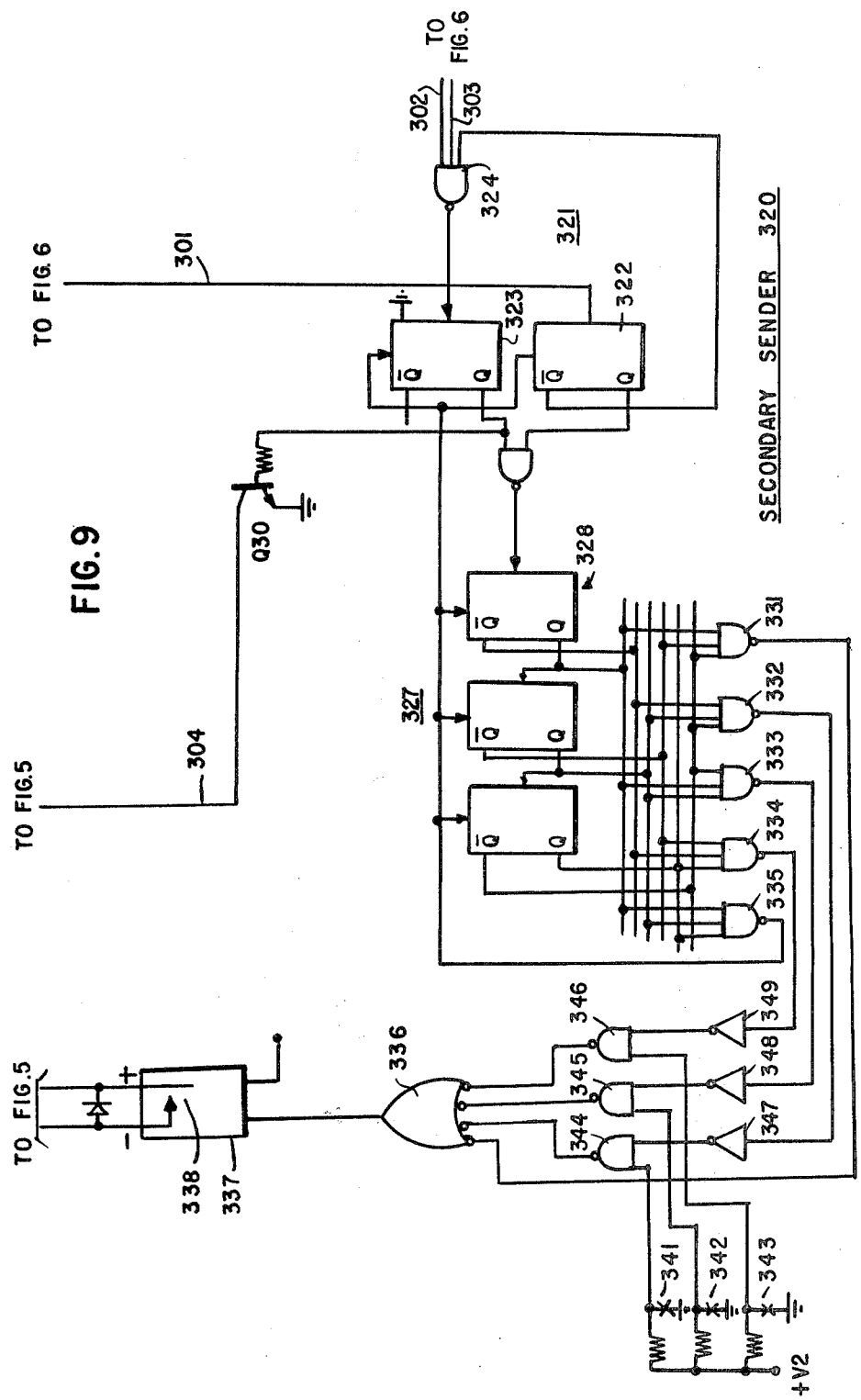

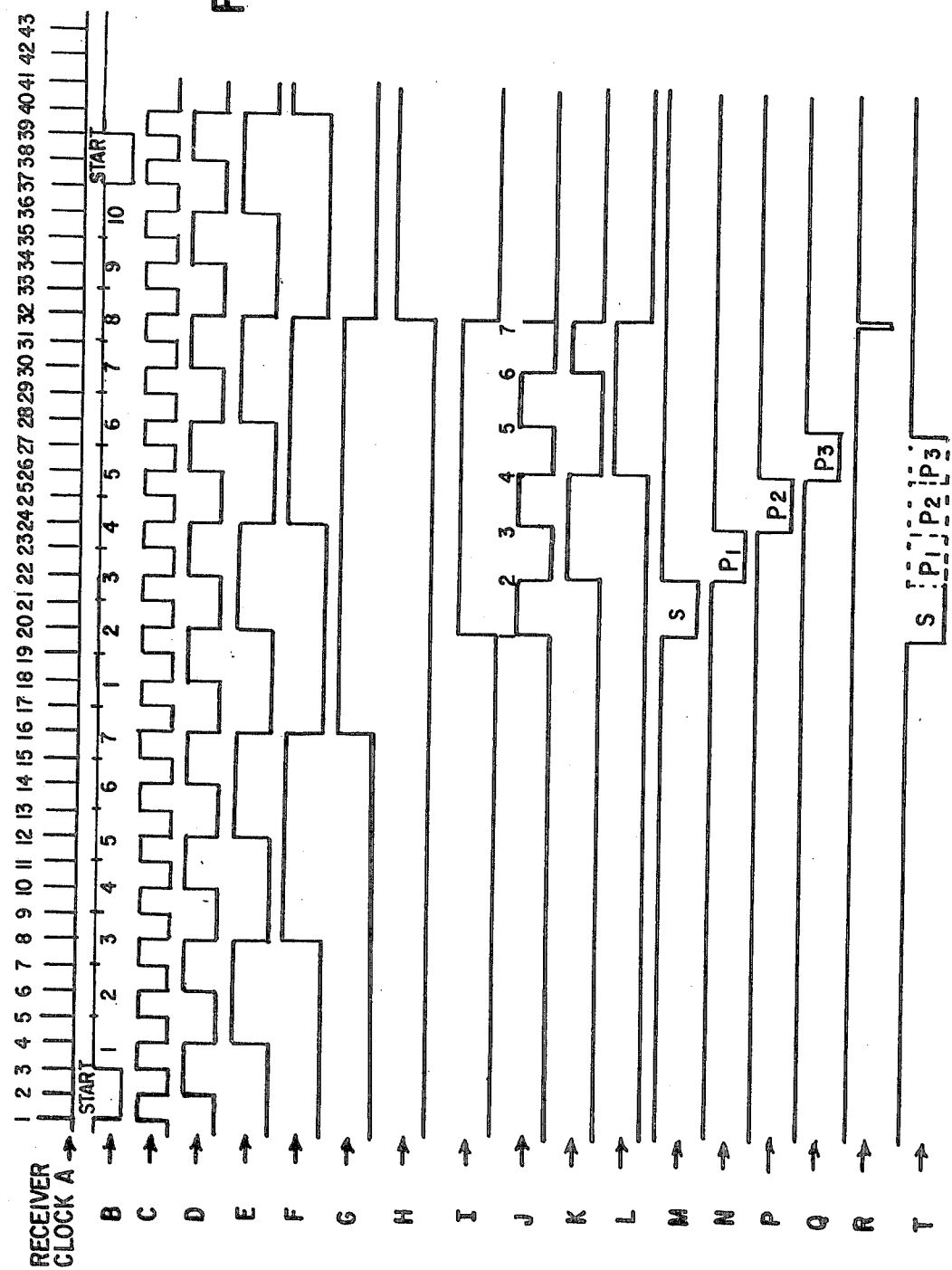

DIGITAL MULTIPLEXING SYSTEM EMPLOYING REMOTE SCANNING OF A PLURALITY OF MONITORING POINTS

This is a division, of application Ser. No. 419,714, filed Nov. 28, 1973, now U.S. Pat. No. 3,938,144 issued Feb. 10, 1976.

BACKGROUND OF THE INVENTION

1. Field of the Invention

This invention relates to data transmission systems, and more particularly to a digital multiplexing system including a sender for transmitting data pulses to a receiver over a transmission line wherein the data pulses effect synchronization of the receiver with the sender.

2. Description of the Prior Art

Various types of multiplexed data transmission systems have been disclosed in the prior art for transmitting data via a sender from a plurality of locations to a remotely located receiver. In certain systems, special transmission lines are required to permit data transmission between the locations of the sender and the receiver, thus adding to the cost of the system.

In addition, to permit accurate recovery of the data transmitted from the sending location ot the receiving location, it is necessary that the receiver be synchronized with the sender. Generally, the sender and receiver each include precision clock circuits, including crystal oscillators, for example. However, the frequency output of the receiver must be set to correspond with that of the sender to permit the receiver to operate in synchronism with the sender. The initial adjustment of the receiver clock during installation may require the use of various measuring instruments which may be undesirable particularly when the receivers are installed at remote locations. In addition, since the sender and receiver clocks operate independently of one another, some provision must be made to compensate for drift of receiver oscillator as may occur due to ambient temperature change or component ageing.

It would be desirable therefore to have an inexpensive multiplexed data transmission system which is capable of monitoring a plurality of points over an extremely long distance over existing communication lines, such as telephone grade lines, for example. It would also be desirable to have a multiplexed data transmission system in which the receiver automatically synchronizes itself with the sender, thereby requiring no special internal clock and eliminating the need for instrumentation to synchronize receiver and sender operations.

SUMMARY OF THE INVENTION

Therefore, it is an object of the invention to provide an inexpensive multiplexed data transmission system including a sender for monitoring a plurality of monitoring points and for transmitting data representing the conditions of the monitoring points to a receiver over regular grade telephone lines which require no special balancing or correction.

It is another object of the invention to provide a data transmission system wherein conditions indicated at a plurality of monitoring points are transmitted to a receiver which accepts and displays the information representing the conditions of the monitoring points being monitored.

It is a further object of the invention to provide a multiplexed data transmission system wherein receiver operation is automatically synchronized with the sender.

Another object of the invention is to provide a receiver for use in such system which can be tuned without instrumentation to be operable in synchronization with a corresponding sender.

It is yet another object of the invention to provide a start-stop multiplexed date transmission system wherein information provided at a plurality of monitoring points may be transmitted over a communication line from a sending location to a receiving location remote from the sending location during a first group of timing intervals and wherein information may be transmitted over the communication line from the receiving location to the sending location duration a second group of timing intervals.

Another object of the invention is to provide a digital multiplexing system for transmission over voice grade telephone lines which provides inherent security of the line and which indicates open or short circuit conditions of the line.

These and other objects of the invention are achieved by the present invention which provides a multiplexed data transmission system including sender means having monitoring point sensing means operable to provide outputs indicative of normal or off-normal conditions of a plurality of monitoring points, sequencing means controlled by clock pulse generating means for sequentially scanning the outputs provided by the point sensing means to produce a serial data pulse train including a start pulse and pulses representing the information provided at the monitoring points, and switching means responsive to the data pulse train to effect transmission of the data to a receiver means over a transmission line.

The receiver means comprises a clock pulse generating means, including a synchronized or force-fired clock which is responsive to the start pulse of the data pulse train to effect the generation of receiver clock pulses for gating the serial data pulses into a serial-to-parallel converter means. The clock pulse generating means is also operable to count the data pulses and provide a transfer pulse for effecting parallel transfer of the data pulses shifted into the serial-to-parallel converter means into data storage means when all of the data pulses have been received.

The data storage means may include temporary storage means responsive to the storage of the data pulses to provide an indication that one or more of the monitoring points has returned to a normal condition. The data storage means may also include permanent storage means responsive to the storage of the data pulses to provide an alarm indication whenever one or more of the monitoring points is off-normal and to permit identification of each monitoring point providing an off-normal indication.

The receiver means further includes means for monitoring the condition of the transmission line, and providing a first indication as the result of an open-circuit condition for the line, and a second indication in the case of a short-circuit condition for the line.

In addition, in accordance with the feature of the invention the receiver means includes visual indicating means for indicating that the clock pulse generating means of the receiver means is not in synchronism with the sender clock pulse generating means and means for adjusting the rate of the receiver clock pulse generating means to achieve synchronism with the sender clock pulse generating means. Moreover, such adjustment of the rate receiver clock pulse generating means to the speed of the sender clock pulse generating means can be made without the use of test instruments.

The multiplexed data transmission system of the present invention may provide bidirectional transmission of information over a common transmission line. The sender means includes an inhibit means operable to inhibit transmission of information from the sender to the receiver means during alternate frames, normally preventing data transmission during alternate scan frames to provide time for enabling the receiver means to synchronize itself with the sender means.

In accordance with the invention, a further or secondary sender means may be employed at the location of the receiver means and enabled to transmit information from the location of the receiver means to the location of the other, or primary, sender means during a portion of the time frames for which the primary sender is inhibited. Secondary receiver means at the location of the primary sender means is enabled to receive the information provided by the secondary sender. The secondary send/receive apparatus operates in a manner similar to the primary send/receive apparatus with synchronization of the secondary receiver with the secondary sender being affected through the use of a synchronized or force-fired clock in the secondary receiver which is responsive to a start pulse provided by the secondary sender. The secondary receiver means is enabled to receive information only when the secondary sender means is transmitting. During the time the primary sender means is transmitting, the secondary receiver means is inhibited by the inhibit means of the primary sender means. In addition, whenever the secondary sender means is transmitting, the primary receiver means is inhibited.

Thus, in the multiplexed data transmission system of the present invention wherein the primary send-receiver apparatus is operable as a start-stop data transmission system for sending information over a transmission line from a first location to a second location, the provision of a secondary sender means and a secondary receiver means enables information to be transmitted over the same transmission line from the second location to the first location during a portion of the time slot which defines the stop pulse for the primary send-receive system.

DESCRIPTION OF THE DRAWINGS

FIG. 1 is a block diagram of an embodiment for a sender for use in the multiplexed data transmission system provided by the present invention;

FIG. 3 is a schematic and partial block diagram of the sender shown in block form in FIG. 1;

FIGS. 4A–4E illustrate waveforms of signals for circuits of the sender shown in FIG. 3;

FIGS. 5–7, when arranged as shown in FIG. 12, provide a schematic circuit and partial block diagram of the receiver shown in block form in FIG. 2;

FIGS. 8A–8F illustrate waveforms of signals for use in the generation of shift pulses for the receiver shown in FIGS. 5–7;

FIG. 9 is a schematic circuit and partial block diagram of a secondary sender for the multiplexed data transmission system of the present invention;

FIG. 10 is a schematic circuit and partial block diagram of a secondary receiver for the multiplexed data transmission system of the present invention;

FIG. 11 illustrates waveforms of signals for the secondary receiver shown in FIG. 10; and, FIG. 12 shows how FIGS. 5–7 are to be arranged.

DESCRIPTION OF PREFERRED EMBODIMENTS

General Description

The present invention provides a digital multiplexing system for transmitting information from a plurality of monitoring or test points to a receiver at a location remote from the location of the test points. The test points may, for example, be connected to apparatus associated with a plurality of roof top air conditioning units to permit the registration of fault indications at a location remote from the location of the air conditioning units.

Figure 2:
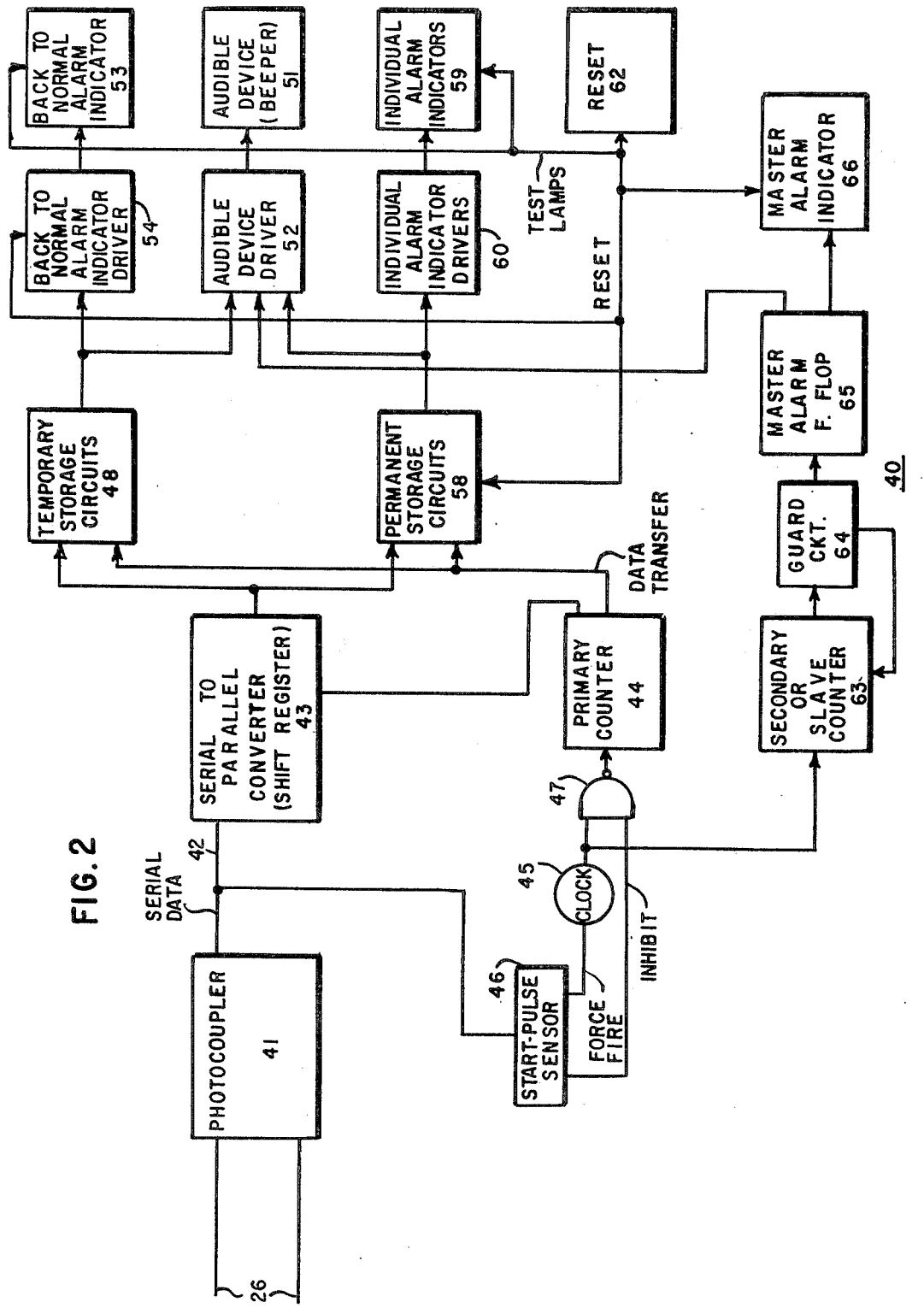
FIG. 2 is a block diagram of an embodiment for a receiver for use in the multiplexed data transmission system provided by the present invention.

The multiplexing system of the present invention includes a sender 20, shown in block diagram form in FIG. 1, and a receiver 40, shown in block diagram form in FIG. 2.

With reference to FIG. 1, the conditions at a plurality of test points, indicated generally at 21, are monitored by a point sensing circuit 22 which provides a plurality of output signals at points 22a, 22b, 22c, 22d, for example, each of which is indicative of the condition of a different one of the test points 21. The point sensing circuit 22 also serves as an interface circuit to provide isolation between the test points 21 and the electronic circuits of the sender 20.

The outputs of the point sensing circuit 22, such as outputs 23a–23d shown in FIG. 1, are sequentially scanned by the sequencing circuit 24 under the control of a clock 27, to permit the signals to extend to inputs of an output gate circuit 23 and thence to a key switch circuit 25 in serial fashion. The key switch circuit 25 responsively effects the generation of output pulses over a data line 26 which is connected to the receiver 40 (FIG. 2).

The sequencing circuit 24 counts out a block of clock pulses defining a frame to provide a plurality of time slots for each scanning cycle, including a separate time slot for each of the test points and an additional time slot to permit the transmission of a start pulse used to enable synchronization of the receiver 40 with the sender 20.

An inhibit circuit 28 driven by the sequencing circuit 24, inhibits the gate circuit 23 during alternate frames preventing data transmission for alternate scanning cycles to provide time for enabling the receiver 40 to synchronize itself with the sender and latch onto the proper signal.

The serial data provided at the output of the gate circuit 23 includes a start pulse followed by a plurality of sequential data bits which correspond in number to the number of test points 21. Each data bit represents the condition of a different one of the test points 21 and by way of example, a logic 0 level bit may be used to indicate a normal condition and a logic 1 level bit may be used to indicate an off-normal or alarm condition. The sequence of logic level bits, including the start pulse and the logic 1 or logic 0 data bits which represent the conditions of the test points 21, are transmitted to the receiver over the data line 26.

Referring to FIG. 2, there is shown a block diagram of the receiver 40. The receiver 40 is connected to the transmission line 26 to receive the serial data transmitted by the sender 20 and to convert the serial data to parallel form to permit the display of information represented by the coded data bits in appropriate display circuits.

The receiver 40 includes an interface circuit 41 which may, for example, be a photocoupler circuit, which provides DC isolation between the transmission line 26 and logic circuits of the receiver 40.

The serial data transmitted over transmission line 26 is received by the photocoupler circuit 41 and passed to a serial-to-parallel converter 43. The serial data is clocked into the serial-to-parallel converter 43 by shift pulses provided by a primary counter circuit 44. The primary counter circuit 44 is in turn driven by a synchronized or force-fired clock 45.

The synchronized clock 45 is operable when enabled to effect the generation of clock pulses, which are extended over gate 47 to the receiver circuits including the primary counter 44, to synchronize the operation of the receiver circuits. The clock 45 is synchronized and the gate 47 is enabled by a start pulse sensor circuit 46 which is connected to the output of the photocoupler circuit 41 and is responsive to each start pulse, which appears as the first pulse on each data pulse train transmitted by the sender 20, to provide outputs for synchronizing the clock 45 and enabling the gate 47. The provision of a start pulse generated by the sender 20 synchronizes the clock 45 with the sender circuit 20.

The primary counter 44 also counts the received data pulses and provides a data transfer pulse at the end of each frame to effect the transfer of the information shifted into the serial-to-parallel converter 43 into a plurality of temporary storage circuits 48. The temporary storage circuits 48 may comprise a plurality of latch circuits including a separate latch circuit for each data bit being transmitted.

The function of the temporary storage circuits 48 is to effect the provision of return-to-normal indications for one or more of the test points 21. The temporary storage circuits 48 control a back-to-normal indicator 53 over an associated driver circuit 54 to provide an indication that one or more of the test points 21 which was previously indicating an off-normal condition has returned to a normal condition as indicated by a change in the corresponding bit of the data pulse train from a logic 1 level to a logic 0 level.

The temporary storage circuits 48 further control an audible alarm device 51 which is energized over an associated driver circuit 52 by the temporary storage circuits 48 to provide an audible alarm to indicate a return-to-normal condition for one of the test points 21.

The receiver 40 may also include a permanent storage circuit 58 including a plurality of latch circuits corresponding in number to the number of data bits being transmitted by the sender 20. The data bits are gated into the latch circuits of the permanent storage circuits 58 at the end of each frame under the control of the primary counter 44.

The function of the permanent latch circuits 58 is to provide outputs indicating off-normal or alarm conditions for one or more of the test points as represented by the data bits gated into the permanent storage circuits 58, and to identify the source of each off-normal condition. The permanent storage circuits 58 control the audible alarm device 51 to provide an audible alarm whenever one of the test points 21 goes off-normal. The permanent storage circuits 58 also control individual alarm indicators 59, over associated driver circuits 60 to indicate which of the test points 21 is at an off-normal condition. The individual alarm indicators 59 include a separate indicating device for each of the test points 21.

When all of the test points 21 are indicating a normal condition, the data bits transferred to the temporary and permanent storage circuits 48 and 58, respectively, will be ineffective to cause an alarm indication.

On the other hand, if one or more of the test points 21 is indicating an off-normal or alarm condition, the permanent storage circuits 58 will effect enabling of the audible alarm device 51 as well as an alarm indicating device of the alarm indicators 59 to indicate the source of such off-normal condition.

The receiver 40 includes a reset circuit 62 which is manually operable to provide reset of the permanent storage circuits 58 to deactivate the audible alarm device 51 and the individual alarm indicators 59.

In addition to the capability of providing indications of the conditions for a plurality of test points 21 the receiver 40 also monitors the condition of the transmission line 26 and detects and displays alarms indicative of open or short circuit conditions for the line 26 as may occur as the result of tampering or malfunction in the transmission line 26. The receiver 40 also recognizes restoration of a broken or shorted transmission line and provides an indication of a return-to-normal condition for the transmission line 26.

To this end, the receiver 40 includes a secondary or slave counter 63 and an associated guard circuit 64. The secondary counter 63 is driven by the force-fired clock 45 in parallel with the primary counter 44. The secondary counter 63 follows the start pulse and makes sure that the start pulse is always present and that such pulse appears at the proper time slot.

The guard circuit 64 is enabled if the start pulse does not appear within the preselected time, as for example as the result of an open circuit condition for the line, the guard circuit 64 sets a master alarm flip flop 65 which in turn enables a master alarm indicator 66 to provide a visual alarm. The master alarm flip flop 65 also energizes the audible device driver 51 over the associated driver circuit 52 to provide an audible alarm.

In the case of a short circuit condition for the transmission line 26, the start pulse will not be received, and accordingly the secondary counter 63 will enable the guard circuit 64 to set the master alarm flip flop 65 thereby energizing the master alarm indicator 66 and the audible device driver 52.

The master alarm indicator 66 provides a first indication in the event of an open circuit condition for the transmission line and a second indication whenever the transmission line is shorted.

DETAILED DESCRIPTION

Referring to FIG. 3, there is shown a schematic and partial block diagram of the sender 20. The remote test or monitoring points 21 are connectable to the sender 20 over a terminal strip 81 which provides a pair of terminals, such as terminals 1 and 1c for each test point being monitored. In an examplary illustration wherein seven remote test points are to be monitored, seven pairs of terminals 1, 1c; 2, 2c; etc. are provided.

A first terminal of each pair, such as the terminals 1–7 are individually connected to a supply voltage +V1, which may be 15VDC, over coils of a plurality of relays K1–K7, which comprise the point sensing circuit 22. A second terminal of each pair, including terminals 1c–7c, are connected to ground.

Relays K1–K7, which are normally deenergized, have normally open contacts K1a–K7a, respectively. In the event of an alarm condition at one or more of the test points, the corresponding interface relay K1–K7 is energized to close the associated contacts K1a–K7a.

The contacts K1a–K7a of the interface relays K1–K7 are serially connected between outputs of a decoder circuit 82 and a summing gate 23. Decoder circuit 82 together with a counter 83 comprise the sequencing circuit 24. The decoder circuit 82 may, for example, be the type 9301, commercially available from Fiarchild Semiconductor and the counter 83 may be the type N8281 4-bit counter which is commercially available from National Semiconductor. The summing gate 23 may be a multiple input OR gate having inverting inputs, such as the type 1802, commercially available from Motorola.

The four bit counter 82 is driven by clock 27 which provides a time base for both the sender 20 and the receiver 40 of the multiplexing system as will be shown in more detail hereinafter. The clock circuit 27 is comprised of a pair of switching transistors Q1 and Q2 and associated bias elements including resistors R1–R4 capacitor C1 and diode D1. Power is supplied to the clock circuit 27 from voltage source V1 over a voltage regulator circuit 84 which includes a transistor Q3, a resistor R5 and a Zener diode Z1.

The clock circuit 27 is operable as a free running oscillator providing output pulses at a 15Hz rate as transistors Q1 and Q2 are alternately rendered conductive and non-conductive. The frequency of oscillation of the clock 27 is determined by the values of capacitor C1 and resistors R1 and R2.

The output of the clock 27 is counted by the counter 83 which supplies binary coded decimal inputs to the decoder circuit 82. For each group of ten pulses counted by the counter 83 and supplied to the decoder 82 in BCD code, the decoder 82 responsively provided logic 0 level signals at outputs 91–99 in succession.

A first output 91 of the decoder 82 is extended directly to a first inverting input of the multiple input OR gate 23. Outputs 92–98 of the decoder 82 are extended over normally open contacts K1a–K7a of relays K1–K7, respectively, to further inverting inputs of the gate 23.

Output 99 of the decoder circuit 82 is extended to a clock input of a JK flip flop 86, which comprises the inhibit circuit 28, and also to a reset input of the counter 83. The flip flop 86 may, for example, be of the DTL family such as the type 9093 commercially available from ITT. The output $\overline{Q}$ of the JK flip flop 86 is extended to the output of the multiple input gate 23 at point 101 and effectively inhibits gate 23 whenever the flip flop 86 is set by maintaining point 101 at ground potential.

The output of the summing gate 23 is connected to an input of the key switch device 25, which may, for example, be a solid state relay such as the type MD100-1A commercially available from Multiplex Communications.

The solid state relay 25 has a negative input 102 connected to point 101 at the output of summing gate 23 and a positive input 103 connected to a source of regulated DC voltage +V2, which may be 5VDC. The solid state relay 25 has outputs 106 and 105 connected to terminals T and R, respectively of the terminal strip 81 and normally provides an open circuit across terminals R and T when the relay is unenergized.

Terminals T and R are connectable to the transmission line 26 which may, for example, comprise a standard two wire telephone line. It is pointed out that a regular grade telephone line may be employed to permit transmission of the data between the locations of the sender 20 and the receiver 40 and the telephone line need not be balanced or corrected.

The solid state relay 25 is controlled by the voltage level at point 101 and thus is influenced by the state of the flip flop 86. Whenever the flip flop 86 is set, the solid state relay follows the output of the summing gate 23 and is energized to short circuit the transmission line 26 providing a mark pulse whenever a logic 0 level output is provided and deenergized to provide a space pulse on the line 26 whenever a logic 1 level output is provided at point 101. The solid state relay 25 can key a 20 or 60 milliamp, 300V loop which is isolated DC-wise from the logic circuits of the sender 20.

Sender Operation

Assuming that all of the test points 21 are indicating a normal condition, then all of the relays K1–K7 are deenergized, and the corresponding contacts K1a–K7a are open. The clock 27 is free running providing the clock pulses shown in FIG. 4A. In the exemplary embodiment wherein seven test points 21 are being monitored, each scanning cycle is defined by nine clock pulses providing nine time slots. The clock pulses are extended to the four bit counter 83 which counts the clock pulses and provides outputs to the decoder 82 in a BCD code.

The first clock pulse of each frame resets the counter 83 to count of zero such that output 91 of the decoder 82 is at a logic 0 level and the remaining outpus 92–99 of the decoder 82 are at a logic 1 level. Under this condition, the output of summing gate 23 is at a logic 1 level as shown for the first frame in FIG. 4B.

Assuming the inhibit flip flop 86 is set, then during the first time slot, the sender 20 provides a start pulse in response to the first output of summing gate 23 shown in FIG. 4B. The pulse output of gate 23 controls the solid state relay device 25 to provide a space pulse (current to no current condition) on the transmission line 26.

The next clock pulse advances the counter 83 to the 1000 state such that the second output 92 of the decoder 82 changes from a logic 1 to a logic 0 level and output 91 returns to a logic 1 level. Since contact K1a is open, the output of the summing gate 23 goes to logic 0 as shown in FIG. 4B. Accordingly, the solid state relay device 25 is energized providing a mark pulse (no current to current condition) on the transmission line 26.

As the counter 83 continues to sequence through time slots 3–8, contacts K2a–K7a, which represent the conditions of the test points connected to terminals 2, 2a through 7, 7a, are scanned. As the counter 83 sequences through counts 3–8, under the control of the clock 27, the voltage levels at each of the outputs 93–98 of the decoder 82 change from a logic 1 to a logic 0 level and back to a logic 1 level in sequence. However, since contacts K2a–K7a are open, the output of the summing gate 23 remains at a logic 0 level as shown in FIG. 4B, and the solid state relay 25 remains energized.

When the tenth clock pulse (or first clock pulse of the second frame) is produced, (FIG. 4A) output 99 of the decoder 82 goes from a logic 1 level to a logic 0 level, resetting the counter 83 to its 0000 state and setting the flip flop 86 such that a logic 0 level signal is provided at the output $\overline{Q}$ of the flip flop 86 as shown in FIG. 4C.

Since the output $\overline{Q}$ of the flip flop 86 is connected to the output of summing gate 23 at point 101, the voltage waveform at point 101 is influenced by the state of flip flop 86. More specifically, whenever flip flop 86 is reset, the output $\overline{Q}$ of the flip flop is at a logic 0 level and point 101 is held at near ground potential.

Accordingly, as the counter 83 sequences under the second frame of clock pulses, the output of summing gate 23 is maintained at ground potential and the transmission of data is inhibited during the second frame of clock pulses. It is easily seen that the start pulse shown in phantom in FIG. 4B would have been provided in the second frame except for the inhibiting function provided by flip flop 86.

The above sequence of events continues, providing a start pulse during the odd numbered frames three, five, etc., and no pulses during the even numbered frames four, etc., as indicated in FIG. 4B.

Digressing, an indicating device 85, embodied as a light emitting diode, is connected over a resistor R6 to the output $\overline{Q}$ of the flip flop 86 and to a voltage source +V2. The light emitting diode 85 is energized whenever the flip flop 86 is reset and is deenergized whenever the flip flop is set. Thus, under normal conditions as the flip flop 86 is set and reset during alternate frames, the light emitting diode 85 flashes on and off indicating the flip flop 86 is functioning properly.

Alarm Transmission

Assuming, for example, that one of the test points 21, such as the test point connected to the terminals 2 and 2c, of terminal strip 81 is indicating an off-normal or alarm condition, relay K2 is energized causing associated contacts K2a to close such that a path is completed between output 93 of the decoder 82 and the corresponding input of the summing gate 23.

The outputs of the decoder 82 are sequentially shifted from logic 1 to logic 0 levels under the control of the clock 27 and counter 83 in the manner described above.

Accordingly, at the start of the first frame as output 91 of the decoder 82 changes from a logic 1 to a logic 0 level, the output of summing gate 23 assumes a logic 1 level to generate a start pulse as shown in FIG. 40 for deenergizing the keying relay 25.

The next clock pulse causes output 91 of the decoder 82 to go from logic 0 to logic 1 and output 92 to go from logic 1 to logic 0 level. However, since contact K1a is open, the output of summing gate 23 goes to a logic 0 level and the relay 25 is energized.

With the third clock pulse output 92 of the decoder circuit returns to a logic 1 level and output 93 of decoder 82 goes from a logic 1 to a logic 0 level and since contact K2a is closed, the output of summing gate 23 goes to logic level providing a second pulse shown in FIG. 4D. Such pulse represents the alarm condition for test point 2 and deenergizes relay 25 to provide a space pulse.

Thereafter, as the decoder 82 continues to cycle under the control of the clock 27 and the counter 83, the summing gate 23 is disabled providing a logic 0 level output at point 101 as shown in FIG. 4D, energizing the relay 25.

When the tenth clock pulse is provided at the start of the second frame, the decoder 82 provides a logic 0 level at output 99 thereof for resetting the counter 83 and for resetting the JK flip flop 86. Accordingly, point 101 is maintained at a logic 0 level for the second frame of clock pulses. Thus, during the second frame of clock pulses, point 101 remains at ground level and the pulses which would normally be provided, as indicated by the two dotted pulses in FIG. 4D, are not produced and the keying relay 25 remains energized during this frame.

Receiver Circuit

Figure 5:
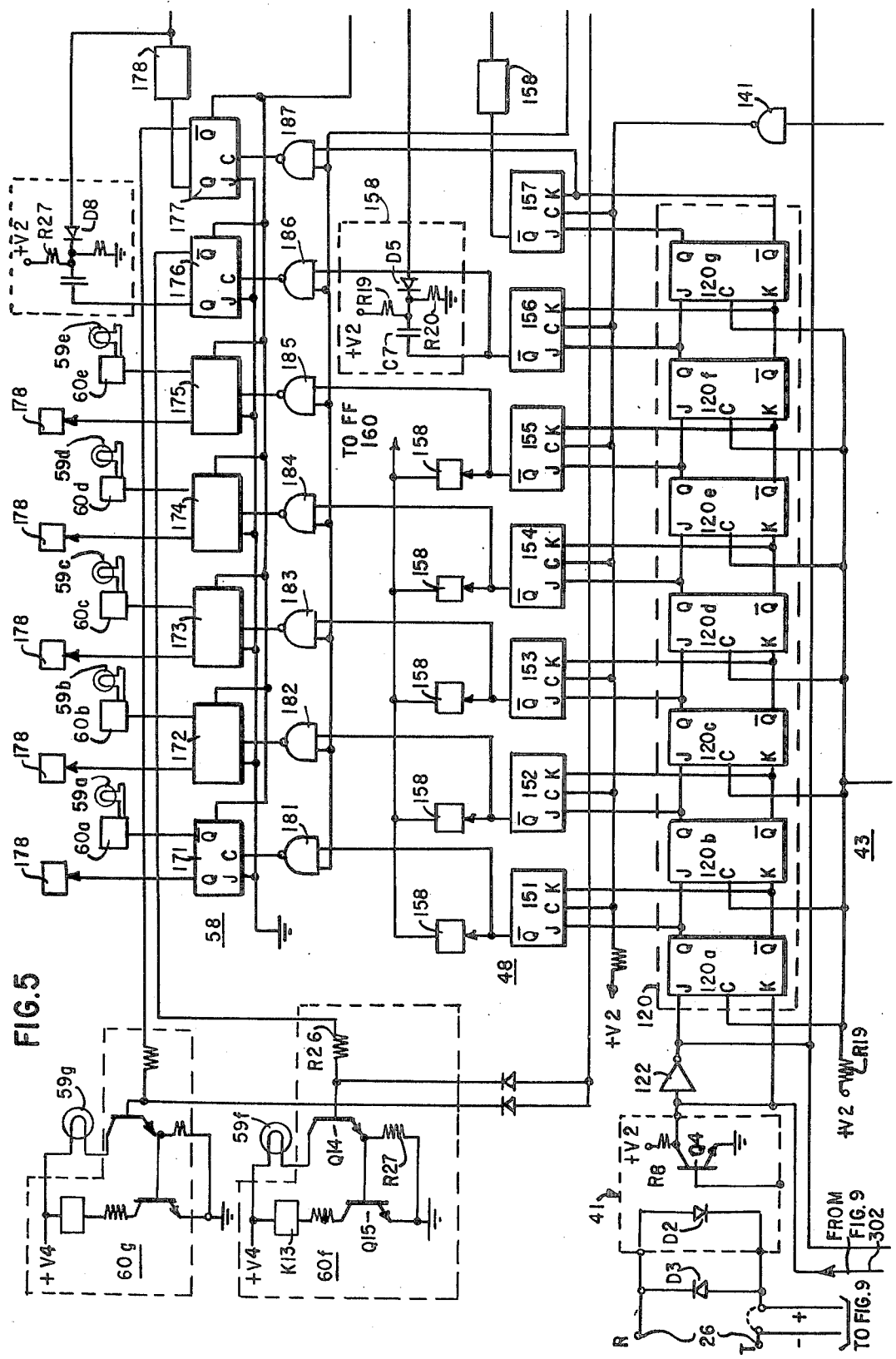

Referring to FIGS. 5–7, arranged as shown in FIG. 8, the serial pulse train transmitted by the sender 20 over the transmission line 26 is received by the photocoupler 41 shown in FIG. 5, and passed to the serial-to-parallel converter 43 of the receiver 40.

The photocoupler 41 includes a photodiode D2 and a photosensitive transistor Q4. Photodiode D2 is connected between the two conductors R and T which comprise the transmission line 26. The phototransistor Q4 has a collector connected over a resistor R8 to a voltage source +V2 and an emitter connected to ground. The base of transistor Q4 is floating.

The serial-to-parallel converter 43 comprises a multistage shift register 120 which in the exemplary embodiment comprises seven JK flip flops 120a–120g, providing seven stages to permit storage of the seven bits representing the conditions of seven test points 21 being monitored by the system. The flip flops 120a–120g may, for example, be the Type SN7473 commercially available from Texas Instruments.

The output of the photocoupler 41 at the collector of transistor Q4 is extended directly to an input K of flip flop 120a, which serves as the input stage of the shift register 120, and over an inverter 122 to an input J of flip flop 120a. The bits of the serial pulse train, including the start pulse and the seven data bits which represent conditions of the seven test points 21 are serially clocked through the shift register 120 as they are received over the photo coupler 41. The clock pulses which effect the shift function are produced by a primary counter 44 which in turn is driven by the forced fired clock 45.

The clock 45, shown in FIG. 6, includes an oscillator stage 125 including transistors Q5 and Q6 and an output driver stage including a transistor Q7. The clock 45 is synchronized by the start pulse sensor 46 comprised of flip flop 127 and transistor Q8 to provide pulses over a NAND gate 128 to the primary counter 44.

The collector of transistor Q5 of the oscillator stage of the clock 45 receives bias from another source +V3, which may be 12 VDC, over a voltage divider circuit including resistor R9, diode D4 and resistor R10. The emitter of transistor Q5 is connected to ground and the base of transistor Q5 is connected to the collector of transistor Q6.

The collector of transistor Q5 is connected to the base of transistor Q6. The emitter of transistor Q6 receives bias from voltage source +V3, over a voltage divider circuit including a variable resistor R11, a capacitor C2 and a resistor R12.

The output of the oscillator stage 125 at the junction of resistor R12 and capacitor C2 is coupled over capacitor C3 to the base of transistor Q7 which comprises the output stage of the clock circuit 45. The base of transistor Q7 is connected over resistor R13 to +V2 source. The collector of transistor Q7 is connected over a resistor R14 to +V2 and to an input of NAND gate 128.

The forced fired oscillator clock 45 is controlled by the start pulse sensing JK flip flop 127 and transistor Q8. Flip flop 127, which is normally reset, has a pulse input J connected to ground and a clock input connected to the output of inverter 122 at the output of the photo-coupled circuit 41. An output Q of the flip flop 127 is connected over an inverter 136 to the base of transistor Q8 which has its emitter connected to ground. The collector of transistor Q8 is connected over a resistor R16 to a source +V3. The collector of transistor Q8 is also coupled over capacitor C4 to the junction of the collector of transistor Q5 at the base of transistor Q6 of the oscillator stage 125 of the clock circuit 45. The output $\overline{Q}$ of the flip flop 127 is extended over inverter 137 and capacitor C5 to the base of transistor Q7. The output $\overline{Q}$ of the flip flop 127 is also connected over conductor 129 to a second input of NAND gate 128.

Variable resistor R11 permits adjustment of the time base for the receiver clock 45. The rate of the receiving clock 45 is set at approximately 30Hz, which is twice the speed of the sending clock 27 (FIG. 3).

The force fired clock 45 is synchronized with each start pulse to time the generation of clock pulses in synchronization with the operation of the receiver circuits 40 with the sender 20. This synchronization of the force fired clock 45 is effected by the start pulse sensor flip flop 127 over transistor Q8.

With the receipt of a start pulse, flip flop 127 is set as soon as the mark-to-space transition of the start pulse occurs, causing transistor Q8 to conduct, thereby grounding the base of transistor Q6 of the oscillator circuit 125 forcing transistor Q6 to conduct.

When transistor Q6 turns on, capacitor C2 discharges over transistors Q6 and Q5 to ground. When the capacitor C2 is discharged, transistor Q7 is momentarily turned off over inverter 137, which is connected between the output $\overline{Q}$ of flip flop 127 and coupled to the base of transistor Q7 through capacitor C5, thereby enabling gate 128. Accordingly, the first force fired clock pulse is provided at the collector of transistor Q7 and extended over gate 128 to the primary counter 44. Since the clock pulse is approximately 8 microseconds long and the switching time of flip flop 127 is on the order of 25 nanoseconds, gate 128 is enabled and the first clock pulse is always extended to the primary counter 44 and the secondary counter 63.

The primary counter 44 is comprised of five JK flip flops 130a–130e, such as the Type SN7473, commercially available from Texas Instruments. The primary counter is operable to count successive clock pulses extended to the clock input C of the first state flip flop 130a over gate 128.

The output Q of flip flop 130a is connected to the clock input C of the shift register 120 over an inverter 131, a differentiating circuit 132, including capacitor C6 and resistors R17–R18, and a gate 133, Briefly, the operation of the primary counter 44, differentiating circuit 132, and gate 133 to produce shift pulses for shift register 120 can be understood with reference to FIG. 6 of the drawings and the waveforms shown in FIGS. 8A–8F.

The waveform for clock pulses provided by the sender clock 27 is shown in FIG. 8A. A portion of the information pulse train, including a start pulse and data pulses, transmitted by the sender 20 is shown in FIG. 8B and corresponds to the pulse train shown in FIG. 4E. The clock plses provided by the receiver clock 125 are shown in FIG. 8C.

As can be seen by comparing the waveforms shown in FIGS. 8A through 8C, the receiver clock 125 operates at twice the rate of the sender clock 25, and receiver clock pulses are provided at the start and midpoint of each data pulse.

The waveform for the output Q of flip flop 130a is shown in FIG. 8D. The Q output of flip flop 130 a is extended over inverter 131, providing the waveform shown in FIG. 8E. Differentiating circuit 133 is responsive to the positive-to-negative transition of each pulse provided by inverter 131 to provide a shift pulse, as shown in FIG. 8F. It is apparent from FIGS. 8B and 8F that the shift pulses are provided at the midpoint of the start and data pulses. Accordingly, when the second receiver clock pulse is counted by the primary counter 44, a shift pulse (FIG. 8F) will be provided over inverter 131, differentiating circuit 132 and gate 133 to the shift register 120 to shift the start pulse into the shift register 120 at the mid-point of the start pluse.

Thereafter, further shift pulses will be provided to the shift register 120 for each additional two clock pulses provided by the clock 45, to shift the data pulses representing the conditions of the test points 21 into the shift register 120.

As has been pointed out, the rate of the receiver clock 45 is 30 Hz, or twice the rate of the sender clock 27. In addition, the duration of the start pulse as well as the data pulses as approximately 33.3 milliseconds. Thus, the information including start pulse and data pulses, received over the transmission line 26 is shifted into the shift register 120 at the midpoint of the start and data pulses.

When the first clock pulse is provided, gate 128 is enabled since, a second input connected to the output $\overline{Q}$ of flip flop 127, is at a logic 1 level.

Accordingly, the first clock pulse is extended over gate 128 to the clock input of the first stage 130a of the primary counter 44, setting the first stage flip flop 130a of the counter 44. When the second clock pulse provided by clock 45 is extended to the counter 44, the first stage flip flop 130a resets, and the negative going signal at the outpt Q of flip flop 130a provides a shift pulse over inverter 131, capacitor C6 and gate 132 to the clock input of the shift register 120, gating the first pulse of the serial data pulse train which is the start pulse, into a first stage of the shift register 120 of the parallel-to-serial converter 43.

The next clock pulse provided by the clock 45 and extended to the primary counter 44 over gate 128 sets flip flops 130a and 130b indicating a count of three.

The JK flip flop 130a is reset in response to the fourth clock pulse provided by clock 45 over gate 128 providing a second shift pulse over inverter 131 and gate 133 to the shift register 120 causing the start pulse to be shifted to the second stage of the shift register 120 and the first data bit representing the condition of the first test point to be shifted into the first stage of the shift register 120.

Thereafter, as the clock 45 continues to provide clock pulses, the primary counter 44 counts the clock pulses to provide shift pulses for the shift register 120 to shift the received data pulses from stage-to-stage of the shift register 120.

When the sixteenth clock pulse is extended to the primary counter 44, the eighth shift pulse is provided and the seventh and last data bit is shifted into the shift register 120. At such time the start pulse has been shifted out of the shift register 120. Thus, the seven stages of the shift register 120 contain the seven data bits representing the conditions of the seven test points 21.

At the 17th clock pulse provided by clock 45, gate 140 is enabled by outputs of the primary counter 44 and an output of the clock 45 to provide a data shift pulse over gate 141 to the temporary storage circuits 48 to permit the information stored in the shift register 120 to be shifted into the temporary and permanent storage circuits 48 and 58.

The temporary storage circuits 48 shown in FIG. 5 include a plurality of JK flip flops 151–157, such as the Texas Instrument Type SN7473, including an individual JK flip flop corresponding to each stage of the shift register 120 and thus to each data bit. Each of the JK flip flops 151–157 have inputs J connected to an output $\overline{Q}$ of corresponding stages 120a–120g, respectively of the shift register 120, and inputs K connected to outputs Q of a corresponding stage 120a–120g of the shift register 120. A clock input to the JK flip flops 151–157 is supplied by the primary counter 44 over gate 140 and at the time the seventeenth clock pulse has been counted by the primary counter 44 permits the data bits stored in stages 120a–120g of the parallel-to-serial converter to be shifted into stages 151–157 of the temporary latch circuits 48.

The outputs $\overline{Q}$ of the JK flip flops 151–157 are connected to inputs of associated differentiating circuits 158, each including a pair of resistors R19, R20 and a capacitor C7. The outputs of the differentiating circuits 158 are connected over isolation diodes D5 to the clock input of a flip flop 160 which controls the audible alarm device 51 over gates 161 and 162 and the return to normal indicator 54, embodied as a lamp L1.

The flip flop 160 has an output Q connected to an inverting input of an OR gate 161. The output of OR gate 161 is connected to an input of NAND gate 162. A second input of NAND gate 162 is connected to the output of a frequency divider circuit 165 whcih is driven by the receiver clock 45 over lead 166. The output of the frequency divider circuit 165 enables gate 162 to effect intermittant energization of the audible alarm device 51 at a rate determined by the setting of the frequency divider circuit 165. Gates 161 and 162 comprise the audible device driver 52. NAND gate 162 has an output connected to an energizing input 163 of the audible alarm device 51.

The flip flop 160 also has an output $\overline{Q}$ connected over resistor R21 to the base of a transistor Q11, which comprises the back-to-normal alarm indicator driver 54 for effecting energization of the indicating lamp L1 which is connected to the collector circuit of transistor Q11 and a voltage source +V4, which may be 24 VDC. Transistor Q11 has an emitter connected to ground. Flip flop 160 has an input J connected to ground such that the flip flop 160 is set responsive to a pulse extended to the clock input thereof whenever an output is provided by one or more of the flip flops 151–157.

If at the time the shift pulse is extended to the temporary latch circuits 48, one or more of the stages 120a–120g of the multistage shift register 120 such as stage 120f, stores a logic 0 level bit indicating an alarm or off-normal condition for the corresponding test point 21, such as test point 2, the corresponding temporary latch flip flop 156 is set when the shift pulse is provided by the primary counter 44.

Thereafter, when test point 2 returns to normal, stage 120f of the shift register 120 stores a logic 1 level bit. Accordingly, flip flop 156 is reset when the next shift pulse is provided by the primary counter 44.

The output provided by flip flop 156 when it is reset is extended over the corresponding differentiating circuit 158 producing a pulse which causes flip flop 160 to be set. When flip flop 160 becomes set, gates 161 and 162 are enabled to effect energization of the audible device 51 and transistor Q11 conducts turning on the back-to-normal indicator lamp L1 thereby indicating that a test point, test point 2 in the present example, has returned to normal.

A reset circuit 62, shown in FIG. 7, including switching transistors Q12 and Q13, resistors R22–R26, diode D7 and capacitor C8 is manually energizable over a pushbutton 164 to provide an output pulse over an inverter 166 to effect reset of flip flop 160 to thereby silence the audible alarm device 51 and deenergize the return-to-normal lamp L1.

The permanent storage circuits 58, shown in FIG. 5, include seven JK flip flops 171–177, such as the Texas Instruments Type Sn7473, including a separate flip flop corresponding to the stages 120a–120g, respectively of the multistage register 120. The flip flops 171–177 each have inputs J commonly connected to ground. The flip flops 171–177 receive clock inputs over associated input gates 181–187 from the outputs $\overline{Q}$ of flip flops 151–157 and the output of the primary counter 44 provided over gates 141' and 215. For example, gate 181 which extends clock pulses to latch circuit 171, has a first input connected to an output $\overline{Q}$ of flip flop 151 and a second input connected to the output of gate 141' to receive the shift pulse provided during each valid data transmission cycle by gate 215. Similarly, gates 181–187, which supply clock pulses to latch circuits 171–177, respectively, each have first inputs connected to the outputs $\overline{Q}$ of corresponding flip flops 152–157 and second inputs connected to the output of gate 215 over gate 141'.

One or more of the flip flops 171–177 is set at the time a clock pulse is provided by associated gates 181–187 if the corresponding shift register stage 120a–120g is storing a logic 0 bit, indicating an off-normal condition for the corresponding test point.

Each of the flip flops 171–177, such as flip flop 177, has an output Q connected over a differentating circuit 178 to the clock input of a flip flop 170 which drives the audible alarm driver gates 161 and 162 in a manner similar to flip flop 160 which is associated with the temporary latch circuits 48. Flip flop 170 is normally reset and is set whenever one or more of the flip flops 171–177 is set to provide an audible alarm indicating an offnormal condition for one or more of the test points 21.

In addition, individual alarm indicating lamps 59a–59g, one corresponding to each of the test points 21, are individually energizable over associated individual alarm indicator drive circuits 60a–60g, respectively by flip flops 171–177 to identify the test point which is providing an offnormal indication. Each drive circut, such as drive circuit 60f, shown in FIG. 5, includes a normally non-conducting NPN switching transistor Q14 having a base connected over a resistor R26 to the output $\overline{Q}$ of the flip flop 176. Transistor Q14 has an emitter connected to ground. The alarm indicating lamp 59f is connected in the collector circuit of transistor Q14.

The other flip flops 171–175 and 177 also have individual alarm indicator drivers 60a–60e and 60g, respectively, which are identical with alarm indicator driver 60f and are operable to energize alarm indicating lamps 59a–59e and 59g, respectively, whenever the associated flip flops 171–175 and 177 are set.

Individual alarm indicator lamps 59a–59g may be supplemented by alarm relays, such as alarm relay K13 for alarm indicator lamp 59f. Relay K13 is energized by a further normally non-conducting NPN switching transistor Q15 of the driver circuit 60F. Transistor Q15 is controlled by transistor Q14 to energize relay K13 whenever the corresponding flip flop 176 becomes set.

The reset circuit 62 further includes a normally non-conducting switching transistor Q16 for permitting manual latch circuits 58. When the pushbutton 164 is depressed, voltage +V2 is extended over a resistor R23 and a diode D9 to the base of transistor Q16 rendering transistor Q16 conductive, thereby providing a ground at the collector of transistor Q16. The collector of transistor Q16 is extended over a lead 194 to the reset inputs of the flip flops 171–177. Thus, whenever pushbutton 164 is depressed, the flip flops 171–177 of the permanent latch circuits 58 are reset such that the corresponding individual alarm indicator driver circuits 60a–60g will be deenergized and indicator lamps 59a–59g are extinguished. In addition, when the push button 164 is depressed, the voltage +V2 extended over resistor R22 and diode D7 enables transistor Q12 disabling transistor Q13 providing a pulse over inverter 166 to the reset input of flip flop 170, resetting flip flop 170. Accordingly, gates 161 and 162 are disabled and the audible alarm device 51 is deenergized Operation of Receiver Circuit For purposes of illustrating the operation of the receiver, it is assumed that test point 2 is providing an off-normal indication and that the remaining test points 1, and 3–7 are indicating normal conditions. In such case, the data pulse train transmitted from the sender 20 is as shown in FIG. 4D.

As a result of the current-to-no-current transition at the beginning of the start pulse, the potential at the collector of transistor Q4 of the photo coupler 41 changes from ground to +V2 volts. This change is sensed by the flip flop 127 which becomes set turning on transistor Q8 over inverter 136. When transistor Q8 turns on, the base of transistor Q6 is grounded momentarily permitting the capacitor C2 of the oscillator circuit 125 to discharge over the transistors Q6 and Q5 to the ground. At the same time, transistor Q7 is momentarily cut off by the transition pulse provided at the negative output of flip flop 127 over inverter 173 and capacitor C5 to the base of transistor Q7.

As transistor Q7 is turned off, the first force-fired clock pulse will be generated which enables gate 128 permitting the clock pulse to be gated over the first stage 130a of the primary counter setting flip flop 130a. Thereafter, the clock oscillator 125 is free-running providing clock pulses at a thirty HZ rate.

When the next clock pulse is provided and extended over gate 128 to the input stage flip flop 130a of the primary counter, flip flop 130a resets, providing a pulse over inverter 131, capacitor C6 and gate 133 to the clock inputs of the multi-stage register 120. Accordingly, the start pulse is gated into the first stage 120a of the register 120.

When the second pulse of the pulse train, representing the condition for test point 1 is received, the no-current to current transition causes the potential at the collector of transistor Q4 of the photo coupler 41 to change from +V2 volts to ground. Accordingly, a logic 1 level signal is provided over inverter 122 at the J input of stage 120a of the shift register 120 and a logic 0 level signal is extended to the K input of stage 120a. The first data pulse is gated to the second stage 120b of the register 120 when the primary counter 44 reaches a count of four and provides a second shift pulse to the register 120.

When the primary counter 44 reaches the count of six, the next data pulse representing the condition for test point 2, which is indicating an off-normal condition is gated into the register 120 causing the first stage 120a to store a logic 1 level while the logic 1 level pulse representing the start pulse is shifted to the third stage 120c, and the logic 0 data pulse representing a normal condition of test point 1 is shifted to the second stage 120b of the register 120.

As the receiver clock 45 continues to cycle, successive clock pulses are counted by the primary counter 44 providing shift pulses to the multistage register 120 to gate the remaining data bits received over the photo coupler 41 into the shift register 120.

At the sixteenth clock pulse, the seven stages 120a–120g of the shift register 120 store the seven data bits representing the conditions of the test point 21. Stages 120a–120e and 120g store logic 1 level bits representing normal conditions and stage 120f stores a logic 0 level bit.

When the seventeenth clock pulse is provided, gates 140 and 141 are enabled by the primary counter 44 to provide a shift pulse for transferring the data stored in the multistage register 120 into the temporary latch circuits 48. Accordingly, latch circuit 156 is set since the corresponding stage 120f is storing a logic 0 level bit, and latch circuits 151–155 and 157 remain reset. In addition, latch circuit 176 of the permanent storage circuits 58 is set if the start pulse of the next cycle appears on time as indicated by the enabling of gate 215, and latch circuits 171–175 and 177 remain reset.

When latch circuit 176 is set, an output provided at the output Q of the flip flop 176 is extended over differentiating circuit 178 setting flip flop 170. Accordingly, gates 151 and 162 are enabled energizing the audible alarm device 51 which is driven by the frequency divider circuit 165 to provide an intermittent audible alarm indicating that one of the test points 21 is providing an alarm.

At the same time, individual alarm indicator driver 60f is enabled by the output $\overline{Q}$ of flip flop 176 to effect illumination of indicator lamp 59f which indicates an off-normal condition for test point 2.

As the clock 45 continues to run, and the primary counter 44 reaches a count of nineteen, gate 139 is enabled effecting reset of the start pulse sensing flip flop 127 over gates 143 and 144 and reset the primary counter 44.

When the alarm condition for test point 2 is noted by an operator, the audible alarm 51 can be silenced by depressing push button 164 of the reset circuit 62 which causes flip flop 170 to be reset thereby disabling gates 161 and 162. In addition, flip flop 176 is also reset and the individual indicator lamp 59b is extinguished. The alarm indication will not be reinitiated during the next scan because a time delay circuit comprised of transistors Q12, Q13, resistor R24 and capacitor C8 will hold flip flop 170 clamped for the subsequent cycle. If during the subsequent cycle another test point goes bad, the audible alarm will remain silent but the corresponding individual indicator lamp will go on, and stay on until reset.

When the trouble condition at test point 2 has been corrected and the status of test point 2 returns to normal, the data pulse train transmitted from the sender 20 is as shown in FIG. 4B.

Accordingly, during the first data transmission cycle after the test points 21 are each indicating a normal condition, the multistage register 120 stores logic 1 level bits in the seven stages 120a–120g when the seven data pulses have been shifted into the register 120. When the transfer pulse is provided by the primary counter 44 as the counter 44 reaches a count of seventeen, temporary latch circuit 156, which was previously set in response to the receipt of an off-normal indication for test point 2 is reset, providing an output over associated differentiating circuit 158 to set flip flop 160. When flip flop 160 is set, gates 161 and 162 are enabled energizing the audible alarm device 51 which is driven intermittently by frequency divider circuit 165 to provide an indication of a return-to-normal condition for test point 2. In addition, the back-to-normal indicator lamp L1 is lit when transistor Q11 of the back-to-normal indicator driver circuit 52 is energized by flip flop 160.

Supervisory Functions

The receiver 40 also includes a supervisory circuit which supervises the condition of the communication line 26 and provides indications of open or short circuit conditions for the loop 26. The supervisory circuit includes a secondary counter 63 and guard circuit 64, shown in FIG. 6, and a master alarm flip flop 65 and a master alarm indicator 66, shown in FIG. 7.

The secondary counter 63 comprises a six-stage counter 200 which is driven by clock pulses provided by the receiver clock 45 extended to the counter 200 over a NAND gate 202. NAND gate 202 is enabled to pass clock pulses provided by the clock 45 to the secondary counter 63 by a control flip flop 201, shown in FIG. 7, whenever the control flip flop 201 is reset. The control flip flop 201 is reset by the start pulse sensing flip flop 127 which provides a pulse over an inverter 205 and a capacitor C10 to the clock input of the flip flop 201 whenever the flip flop 127 is set.

The secondary counter 63 operates in parallel with the primary counter 44 to provide output signals for enabling gates 211–213 of the guard circuit 64.

Gate 211 is enabled during counts 35 and 36. Gate 212 is enabled during counts 36 through 38. Gate 213 is enabled during counts 38 though 40. Since the outputs of gates 211 and 212 are commonly connected over inverter 214 to gate 215, gate 215 is enabled during counts 35 though 38. This is the guard for start pulse appearance period. If during this period the start pulse appears, then it is said that the cycle, as far as the start pulse is concerned, was normal and gate 215 will fire to maintain flip flop 65 in the reset state and also reset the counter 200 through gates 277 and 228. Under the above conditions, gate 213 does not fire.

If the start pulse does not appear within the guard period, then gate 213 is allowed to fire and set flip flops 201 and 65. This, of course, can happen under any of the following three conditions: (a) shorted transmission line, (b) open transmission line, or (c) receive clock out of adjustment.

Gates 211 or 212, as enabled, provide an output pulse which is extended over inverter 214 to enable a NAND gate 215 to control the state of the master alarm flip flop 65. When the master alarm flip flop 65 is set, an enabling input is extended to a gate 216 which has a first input connected to the output $\overline{Q}$ of the master alarm flip flop 65 and a second input connected to the output of the frequency divider circuit 165. The master alarm flip flop 65 is normally reset, and the beginning of the start pulse assures that the flip flop 65 is reset at the start of each frame of pulses.

The output of gate 216 is connected over an inverter 220 and a resistor R31 to the base of a transistor Q18 of the master alarm indicator circuit 66. Transistor Q18 has an emitter connected over a resistor R32 to ground. The collector of transistor Q18 is connected over a resistor R33 and a master alarm indicator lamp L2 to voltage source +V4.

The master alarm indicator circuit 66 may also include a further switching transistor Q19 for driving an alarm relay K15. Transistor Q19 has a base connected to the emitter of transistor Q18 and an emitter connected to ground. The collector of transistor Q19 is connected over a resistor R34 and relay K15 to a voltage source +V4. Indicator lamp L2 and relay K15, which are driven by transistors Q18 and Q19, respectively, provide indications of open or short circuit conditions for the transmission line 26.

The receiver is able to distinguish between a shorted line and the condition where all test points are off-normal.

Regardless of what the data may be, the start pulse should occur every 18 time slots, which means that the transmission line 26 would carry current at all times except when the start pulse is transmitted. The receiver 40 is looking at the line 26 and it senses the condition of current or no current in the line. The line 26 may experience the current to no current continued condition if it gets open due to an open wire, bad power supply (line supply) or sender stuck in the spacing condition. By the same reasoning the line 26 may experience the no current to current continuous condition if the line is shorted at the sender end, or if the sender is struck in the marking condition.

A second NAND gate 217 has a first input connected to the negative output $\overline{Q}$ of the master alarm flip flop 65 and a second input connected to the output of inverter 122 (FIG. 5). The output of gate 217 is connected to the input of inverter 220 (FIG. 7).

The positive output of the master alarm flip flop 65 is connected over a differentiating circuit 221 and a conductor 222 to the clock input of flip flop 170, which is associated with the permanent latch circuits 58, to control the energization of the audible alarm device 51. Accordingly, whenever the master alarm flip flop 65 becomes set, an output pulse provided at the positive output Q of the master alarm flip flop 65 is extended over differentiating circuit 221 and conductor 222 to set flip flop 170 thereby enabling gates 161, 162 to energize the audible alarm device 51. When flip flop 170 is set, the audible alarm device 51 is driven intermittently over gate 162 by the output of the frequency divider circuit 165.

A further gate 213 of the guard circuit 64, enabled by outputs of the secondary counter 63 if the start pulse does not appear in the proper time slot, effects reset of the secondary counter 63 over gates 225–228. In addition, the output of gate 213 is extended over gates 225 and 226 and conductor 229 to set the control flip flop 201 and flip flop 65.

The receiver supervisory circuit also includes a NAND gate 229 which may be enabled by outputs of the primary counter 44 (FIG. 6) during the start pulse period to prevent the receiver 40 from responding to breaks in the transmission line 26 that are less than 50% of one timing pulse in duration or approximately 16.6 milliseconds. Gate 229, when enabled, provides an output over gate 143 and inverter 144 to reset the start pulse sensing circuit flip flop 127 and the primary counter 44. In addition, badly distorted line conditions are sensed through gate 229 which is operable when enabled to extend an output over gates 225 and 226 to set the master alarm flip flop 65 to energize the master alarm indicator circuit 66 over gate 216 and the audible device 51 over flip flop 170.

If the start pulse is less than 50% of a normal pulse it is considered to be a momentary break in the line (a hit). The system ignores such pulse and starts with a fresh frame or cycle. The master alarm cancels out by itself.

If the data are distorted more than 50%, the start pulse is also distorted by the same amount, and through gate 229, a master alarm indication occurs and continues as long as the data are distorted more than 50%.

Whenever the transmission line is restored back to normal, the first start pulse will reset flip flop 201, and counter 63 is allowed to start operating normally again. The next start pulse, if it appears in its proper time slot, resets flip flop 65 through gate 215 as was described previously, and the open line alarm indication will be cancelled automatically.

Open Loop Condition

Under normal conditions, when the next start pulse is received over the photo coupler circuit 41, the start pulse sensing circuit 127 is enabled thereby enabling the receiver clock 45 to generate clock pulses at the 30 HZ rate. The flip flop 127 also effects resetting of the control flip flop 201 over inverter 205 and differentiating circuit 206. When the control flip flop 201 is reset, gate 202 is enabled to follow clock pulses provided by the clock receiver clock 45. The secondary counter 63 counts the clock pulses in synchronism with the primary counter 44. If the start pulse occurs in the proper time slot, gates 211 and 212 are enabled and the secondary counter 63 is reset through gates 214, 215, 227, and 228.

On the other hand, if the start pulse is not provided due to an open loop condition, gate 213 is allowed to fire and through gates 225 and 226, sets flip flops 201 and 65. Counter 63 resets through gates 227 and 228 and remains reset due to the gate 202 which now is being inhibited by flip flop 201.

In the case of an open line condition, gate 217 is inhibited by the logic 0 level output of the inverter 122, (FIG. 5) and accordingly the master alarm indicator circuit 66 is driven by the frequency divider circuit 165 over gate 216 and inverter 220 to provide an intermittent indication representing an open circuit condition for the loop 26.

SHORT CIRCUIT CONDITION

A similar series of events occurs in the case where the transmission line 26 is short circuited. The secondary counter 63 counts clock pulses provided by the receiver clock 45. However, since the start pulse does not appear in its proper or designated time slot, gate 213 is allowed to fire and set the master alarm flip flop 65, and flip flop 201. Gate 202 is again inhibited and counter 63 resets as described previously.

However, for a short-circuit condition, a logic 1 level output provided at the output of inverter 122 permits gate 217 to be enabled by the master alarm flip flop such that the output of gate 217 is maintained at a ground level. Accordingly, the ground level at the output of gate 217 extended over inverter 220 and resistor R31 maintains transistor Q18 and transistor Q19 in a "steady on" condition such that the master alarm indicator lamp L2 and relay K15 is continuously energized to indicate a short-circuit condition for the line 26. Again when line is restored to normal the alarm disappears automatically as was for an open line.

Distorted Line Condition

In the event that an open circuit condition less than 16.6 milliseconds in duration occurs in the loop 26 or if the data pulses transmitted over the line are badly distorted by more than 50%, gate 229, (FIG. 6) is enabled by outputs of the primary counter 44 to provide a reset signal over gates 143 and 144 to the start pulse sensing flip flop 127 and to provide an alarm signal over gates 255 and 226 to reset the control flip flop 201 and to set the master alarm flip flop 65. When the master alarm flip flop 65 is set, flip flop 170 is set enabling gates 161 and 162 and gate 162 follows the output of the frequency divider circuit 165 to intermittently energize the audible alarm device 51. In addition, gate 216 also follows the output of the frequency divider circuit 165 to intermittently energize the master alarm indicator circuit 66.

Receiver Clock Adjust

The master alarm indicator circuit 66 also includes an indicating device L3, embodied as a light emitting diode, which indicates when the receiver clock frequency deviates from the desired rate of twice the sender clock frequency. The light emitting diode L3 has a first terminal connected over a resistor R35 to the outputs of gates 215 and 216 and a second terminal connected to the voltage source +V2.

The light emitting diode L3 is normally driven intermittently by outputs of gates 217 and 216 is synchronism and in phase opposition with the master alarm indicator L2. Gate 217 is driven by the data pulses provided at the output of the photo coupler circuit 41 and gate 216 is driven by the output of the frequency divider circuit 165.

Whenever the receiver clock deviates from the desired rate, the flashing rate of the light emitting diode L3 and the master alarm indicator L2 is determined by the combination of the data bits and the output of the frequency divider circuit 165 which control gates 217 and 216, respectively. In such case, the flashing rate is asymmetrical as opposed to the open line condition, for example, where the flashing rate is determined only by the frequency divider circuit 165, and is thus symmetrical for the light emitting diode L3 and the master alarm indicator L2.

To adjust the frequency of the receiver clock 45 to a desired value, potentiometer R11, (FIG. 6) which is connected in the collector of transistor Q6 is adjusted, varying the frequency rate of the oscillator circuit 125 of the receiver clock 45 to a first setting until the light emitting diode L3 is extinguished. At such time, the potentiometer R11 is further adjusted to a second setting until the light emitting diode is again relit. Then the value of resistor R11 is adjusted to a point intermediate the first and second settings. At such value, the clock rate of the receiver clock 45 is approximately double the speed of the sender clock 27.

Secondary Send-Receive Apparatus

Since the primary send/receive system is a start-stop system, it is possible to use the time slot of the stop pulse to send information from the location of the primary receiver 40 to the location of the primary sender 20 over the communication line 26. In the illustrative embodiment of the primary sender-receiver system described in the foregoing, wherein the duration of the stop pulse of a given frame corresponds to at least ten data pulses, the time slot for the long stop pulse can be used to send back at least three data pulses, for example, which may be commands of some kind, in addition to a start pulse and a stop pulse, with total assurance even if the primary receiver clock 45 drifts to its maximum or minimum limit.

To enable the transmission of information from the location of the primary receiver to the location of the primary sender, a secondary sender circuit 320 shown in FIG. 9, is employed. A secondary receiver 340, shown in FIG. 10, is provided to receive the information transmitted by the secondary sender 320.

Referring to FIG. 9, the secondary sender 320 is generally similar to the primary sender 20 shown in FIG. 3. The secondary sender 320 includes a timing circuit 321, a sequencing circuit 327, a summing gate 336 and a solid keying relay 337. The programming of the three data pulses is provided through a plurality of contacts 341–343 which control the condition of the summing gate 336 over gates 344–346, respectively. Contacts 341–343 are normally open contacts which may be associated with individual condition responsive devices or manually operated switches.

The sequencing circuit 327 under the control of the timing circuit 321 enables the state of each of the contacts 341–343 to be extended to the relay 337 over the summing gate 336. The relay 337 has normally open contacts 338 which are connected in series with the line 26 and the contacts of the keying relay 25 of primary sender 20. Whenever the output of the summing gate 336 is high, the relay 337 is released and there is no current flow in the line 26. When the output of a summing gate 336 is low, the relay 337 is energized and there is current flow in the line 26 provided that the relay 25 of the primary sender 20 is also energized. The relay 337 is operable to transmit a frame of five pulses, including a start pulse, three data pulses and a stop pulse to the location of the primary sender 20, under the control of the sequencing circuit 327 and the timing circuit 321.

The timing circuit 321 includes a pair of flip flops 322, 323 and gates 324, 325. Flip flop 322 is operable as a frequency divider which receives clock pulses at a 30Hz rate over conductor 301 from the forcefired clock 45 of the primary receiver 40 and divides the clock rate by two to provide clock pulses for the sequencing circuit 327 over gate 325 whenever gate 325 is enabled. The state of gate 325 is controlled by control flip flop 323. Flip flop 323 is normally reset and is set by inputs supplied to the flip flop 323 over gate 324 from the secondary counter 63. As will be shown in more detail hereinafter, flip flop 323 is set when the secondary counter 65 reaches a count of twenty thereby enabling gate 325 to follow the output of the frequency dividing flip flop 322 to supply clock pulses to the sequencing circuit 327.

Sequencing circuit 327 is comprises of a three bit counter 328 and associated decoding gates 331–335. The BCD information contained within the three-bit counter 328 is converted into a one-out-of-eight code by the decoding gates 331–335. In the present example, only five of the eight possible outputs are employed. As clock pulses provided by the frequency dividing flip flop 322 are extended to the counter 328 over gate 325, gates 331–335 are sequentially enabled. The output of gate 331 is connected directly to an inverting input of the summing gate 336 and serves to disable gate 336 causing the output of gate 336 to go high to permit keying relay 337 to provide a space pulse for transmission to the location of the primary sender 20.

Gates 332–334 have outputs connected over inverters 347–349, respectively to inputs of gates 344–346 which are associated with contacts 341–343, respectively. The gates 344–346 each have outputs individually connected to different inverting inputs of the summing gate 336. As each of the gates 332–334 are enabled, in sequence, by outputs of the counter 328, the condition of contacts 341–343 is extended over the summing gate 336 to the key switch 337 to enable the transmission of mark or space pulses to the location of the primary sender 20 in accordance with the state of the contacts 341–343.

Decoding gate 335 when enabled effects reset of flip flops 322 and 323 and the counter 328 after each data transmission cycle is completed. Resetting of control flip flop 323 prevents further transmission of data by the secondary sender 320 until the control flip flop 323 is again set in response to outputs of the secondary counter 63 of the primary sender 20, effectively providing a stop pulse since data transmission is inhibited for a time prior to the next start pulse provided by the primary sender 20.

Operation of the Secondary Sender

The operation of the secondary sender 320 is best understood by referring to the schematic circuit diagram of the secondary sender 320 shown in FIG. 9 in conjunction with the schematic circuit diagram for the primary receiver shown in FIGS. 5–7. Assuming initially that all of the circuits of the primary receiver 40 and the secondary sender 320 are in their reset state, then at some time T0, the start pulse of a frame of pulses sent by the primary sender 20 (FIG. 3) is received by the primary receiver. The frame of pulses may also include pulses representing normal or off-normal conditions for the test points 21. However, the condition of the test points 21 is not relevant to the operation of the secondary sender 320.

Referring to FIG. 11, which is a timing chart showing the relationship of signals for circuits of the primary receiver 40 and the secondary sender 320, as soon as the current-to-no-current transition of the start pulse occurs as shown in FIG. 11 at line B, flip flop 127 (FIG. 6) is set and the first force-fired clock pulse of the primary receiver 40 appears at the collector of transistor Q7 The receiver clock pulses are shown in FIG. 11 at line A. This first clock pulse, and subsequent clock pulses, are extended over gates 128 and 202 to the primary and secondary counters which count the clock pulses in the manner described above. The outputs for stages 200a–200f of the secondary counter 63 are shown in FIG. 11 at lines C–H, respectively, as the secondary counter 63 counts the clock pulses provided by the clock 45 of the receiver 40. The clock pulses extended to the secondary counter 63 over gate 202 are also extended over conductor 301 to the frequency dividing flip flop 322 of the secondary sender shown in FIG. 9, causing flip flop 322 to be alternately set and reset with each pair of successive clock pulses.

When the secondary counter 63 reaches a count of twenty, gate 324 (FIG. 9) is enabled by outputs provided over conductors 302 and 303 setting the control flip flop 323 as shown in FIG. 11 at line I, providing an enabling input for gate 325 which permits the pulse train provided by flip flop 322 to be inverted and extended over gate 325 to the three-bit counter 328 of the sequencing circuit 327. The counter 328 counts the pulses provided by the frequency dividing flip flop 322 providing binary coded outputs as shown in FIG. 11 at lines J–L. The BCD information contained within the three-bit counter 328 is converted into a one-out-of-eight code through decoding gates 331–335.

As shown in FIG. 11 at line M, when the first clock pulse is counted by the counter 328, the output of gate 331 goes low providing a start S pulse, enabling the output of the summing gate 336 to go high. The output pulse provided by gate 36 causes the relay 337 to be deenergized thereby blocking current flow in the line 26. The start pulse is always a space because the output of gate 331 is directly connected to an input of summing gate 336.

When the second clock pulse provided by frequency divider flip flop 322 is counted by the counter 328, the output of gate 332 goes low as shown in FIG. 11 at line N. The output of gate 332 is extended over inverter 347 to an input of gate 344 which has a second input connected to contact 321. If contact 321 is open, gate 344 is enabled causing the output of summing gate 336 (pulse P1 shown in FIG. 11 at line S) to go high such that relay 337 is released and there is no current in the line. On the other hand, if contact 341 is closed, gate 344 remains disabled causing the output of gate 336 to be low such that relay 337 is energized and a mark pulse (current in line condition) is transmitted.

Similarly, as third and fourth clock pulses are counted by counter 328, gates 333 and 334 are enabled, as shown in FIG. 11 at lines P and Q to enable the condition of contacts 342 and 343 as represented by pulses P1 and P3 in FIG. 11 at line T, to be extended to the relay 337 over the summing gate 336.

After the start pulse and the three data pulses P1–P3 representing the conditions of contacts 341–343 have been transmitted over the transmission line 326 to the location of the primary sender 20, the next clock pluse causes gate 335 to be enabled providing a reset pulse shown in FIG. 11 at line Q for resetting the counter 328 and flip flops 322 and 323.

Thus, it is apparent that the transmission of data by the secondary sender 320 is completely controlled timewise by the primary sender which effects the generation of clock pulses by the force-fired clock 45 of the primary receiver 40. While the secondary sender 320 is keying the line 26, the primary receiver 40 is blinded by grounding the output of the signal-detecting photocoupler circuit 41 over conductor 304 via transistor Q30 (FIG. 9) which is enabled by control flip flop 323. Thus, the primary receiver 40 is prevented from responding to the information transmitted by the secondary sender 320.

When the control flip flop 323 is reset when data transmission has been completed, transistor Q30 is disabled, removing the ground from the output of the photocoupler circuit 41 such that the primary receiver 40 is conditioned to receive data transmitted by the primary sender 20.

Secondary Receiver

The information transmitted by the secondary sender 320, including the start pulse and three data pulses P1–P3, is transmitted over the line 26 to the location of the primary sender 20 and is received by the secondary receiver 340 shown in FIG. 10. The secondary receiver 340 is generally similar to the primary receiver 40 and includes an input circuit comprised of a photocoupler circuit 351 and a Schmitt trigger circuit 354 which detects the pulses transmitted by the secondary sender 320.

The secondary receiver 340 further includes a start pulse sensing flip flop 360, a force-fired clock 363 and a counter 364 and associated decoding gates 365 which provide synchronization for the secondary receiver 340. The secondary receiver 340 also includes a serial-to-parallel converter 366 which receives the serial data pulses transmitted by the secondary sender and temporary latch circuits 370 which are operable in the manner of the temporary latch circuits 48 of the primary receiver 40.

The secondary receiver 340 may be connected in the communication loop 26 by removing the link 355 and connecting input conductors 352 and 353 of the photocoupler circuit 351 to terminals 356' and 357.

The secondary receiver 340 is allowed to receive information only when the secondary sender 320 is transmitting. During the rest of the time, the secondary receiver 340 is blinded by the Q output of the JK flip flop 86 (FIG. 3) of the primary sender, which inhibits the Schmitt trigger circuit 354. When the Q output of the inhibit flip flop 86 of the primary sender 20 is high, the Schmitt trigger circuit 354 is enabled and information coming from the secondary sender 320 is coupled through the photocoupling circuit 351 and the Schmitt trigger 354 to the shift register 366 and the flip flop 360.

The clock 363 of the secondary receiver 340 is exactly the same clock used in the primary receiver 40. Thus, when the secondary sender 320 is transmitting, the start pulse which indicates the start of a frame of pulses, when received over the photocoupler circuit 351 and the Schmitt trigger circuit 354, effects setting of flip flop 360 which operates in a manner similar to start pulse sensing flip flop 127 of the primary receiver 40 to enable the force-fire clock 363. The clock 363 when enabled provides clock pulses over gate 369 to the binary counter 364 which counts the clock pulses and provides shift pulses over inverter 368 to the serialto-parallel shift register 366 to enable the start pulse, and thereafter the data pulses P1–P3, to be shifted into the shift register 366 at the mid-point of the pulses.

When all of the data pulses P1–P3 have been received and shifted into the shift register 366, a strobe pulse provided by the decoding circuit 365 in response to outputs of the counter 364 enables the data signals to be strobed into the temporary latch circuits 370. The latch circuits 370 are operable in a manner similar to latch circuits 48 of the primary receiver 40 and may be supplemented by suitable indicating circuits to permit the display of the conditions of switches 341–343, as represented by the data pulses P1–P3, respectively. The temporary latches 370 can also be substituted with permanent latches depending on the particular application and customer need. Moreover, although in the illustrative embodiment no supervisory or alarm circuit is disclosed for use in conjunction with the secondary receiver because the secondary receiver location is remote, a master alarm indication circuit may be provided at the location of the primary sender and the secondary receiver if desired.

Operation of the Secondary Receiver

As noted above, the secondary receiver 340 is allowed to receive information only when the secondary sender 320 is transmitting. Thus, while the long stop pulse is being provided by the primary sender 20 through inhibit circuit 86 which grounds the output of the summing gate 23, the inhibit circuit 86 also removes the inhibit input from the Schmitt trigger circuit 354. At such time, information from the primary sender 20 is prevented from entering the line 26 because the solid state relay 25 is picked up and its contacts are closed.

In the case where the secondary sender 320 is transmitting and the secondary receiver 340 is enabled, the primary sender 20 and the primary receiver 40 are inhibited. When the current-to-no-current transition of the start pulse occurs, the output of the photocoupler circuit 351 goes high, causing the output of the Schmitt trigger circuit 354 to switch from a logic 1 level to a logic 0 level. The trigger lead of the start pulse sensing flip flop 360 senses this change and becomes set. When flip flop 360 is set, gate 362 is enabled, and the clock 363 is force-fired over inverters 371 and 372 causing the BCD counter 364 to step to a count of one.

When the second clock pulse is provided, the counter 364 steps to a count of two and a shift transition occurs at this time. The shift pulse, extended over inverter 368 to the shift register 366, enables the start pulse to be gated into the first cell of the shift register 366. It is pointed out that the shift transition occurs at the midpoint of the start pulse (and of the data pulses) in the manner shown above with reference to the primary receiver.

The data pulses are received in a similar manner and shifted into the shift register 366 and the start pulse is shifted out of the shift register 366. At such time, the shift register 366 contains the three data pulses P1–P3. When the ninth clock pulse is provided by the BCD counter, gate 373 is enabled providing a strobe pulse to the temporary latch circuits 370 enabling the contents of the shift register 366 to be gated into corresponding stages of the temporary latch circuit.

When the eleventh clock pulse is counted by the BCD counter 364, gate 374 is enabled providing a reset signal which is extended over inverter 375 to reset the counter 364 and to reset flip flop 360 to enable the secondary receiver 340 to respond to the next frame of data pulses.

As the counter 83 of the primary sender 20 continues to cycle, and prepares to transmit a further frame of data pulses, the inhibit flip flop 86 will be set inhibiting the Schmitt trigger circuit 354 of the secondary receiver to blind the secondary receiver and to remove the inhibit from the output of the summing gate 23 of the primary sender 20 to enable the transmission of a further frame of data pulses to the primary receiver 40 in the manner described above.

We claim:

1. In a multiplexed data transmission system for transmitting data over a transmission line from a first location to a second location, first sender means at said first location including means for generating a serial pulse train including a start pulse and a plurality of data pulses during each of a plurality of time frames, inhibit means for inhibiting the transmission of pulse trains during alternate time frames, and means for transmitting the pulse train provided during at least certain ones of said time frames to said second location over said transmission line, first receiver means at said second location including means for receiving said pulse train, data storage means, sequencing means including clock pulse generating means responsive to the start pulse to provide a plurality of clock pulses for enabling said data pulses to be gated into said data storage means, and second sender means at said second location having means enabled by said sequencing means during a portion of each time frame in which the transmission of data by said first sender means is inhibited to generate a further serial pulse train, including a start pulse and a plurality of data pulses, for transmission over said transmission line to said first location.

2. A data transmission system as set forth in claim 1 including second receiver means at said first location including means for receiving said further pulse train, further data storage means and further sequencing means including clock pulse generating means responsive to the start pulse of said further pulse train to provide clock pulses for enabling said further data pulses to be gated into said further data storage means.

3. In a multiplexed data transmission system for permitting bidirectional transmission of data over a transmission line between first and second locations, first sender means at said first location having means for generating a serial pulse train including a start pulse, and a plurality of data pulses followed by a stop pulse for transmission to said second location over said transmission line, first receiver means at said second location including data storage means and synchronizing means including clock pulse generating means responsive to said start pulse of the serial pulse train to provide clock pulses for effecting the storage of said data pulses in said data storage means, second sender means having data means operable when enabled to generate a further serial pulse train including further data pulses and enabling means responsive to clock pulses provided by said clock pulse generating means during the time said stop pulse is being transmitted by said first sender means to enable said data means to effect transmission of said further serial pulse train over said transmission line from said second location to said first location, and second receiver means at said first location including further data storage means and further synchronizing means responsive to at least one pulse of said further pulse train to effect the storage of said further data pulses in said further data storage means.

4. In a multiplexed data transmission system for transmitting data over a transmission line from a first location to a second location remote from the first location, first sender means at said first location for generating a pulse train including a start pulse and a plurality of data pulses during each of a plurality of time frames, means for enabling said pulse train to be transmitted over said transmission line to said second location and means for inhibiting transmission of said pulse train during alternate frames to provide a stop pulse of a predetermined duration, first receiver means at said second location for receiving said pulse train including said start pulse and said data pulses, clock pulse generating means responsive to said start pulse to provide clock pulses for synchronizing the operation of said first receiver means, data storage means, and sequencing means controlled by said clock pulses for enabling said data pulses to be stored in said data storage means, second sender means at said second location operable when enabled to transmit further data pulses to said first location over said transmission line, said second sender means being enabled by clock pulses provided by said clock pulse generating means during the portion of the frame for which said stop pulse is being provided by said first sender means, and second receiver means at said first location for receiving said further data pulse train provided by said second sender means, said second receiver means including a further clock pulse generating means enabled by the start pulse provided by the second sender means to generate clock pulses for synchronizing the operation of said second receiver means, further data storage means, and further sequencing means controlled by said further clock pulses to effect the storage of said further data pulses in said further data storage means.

5. a data transmission system as set forth in claim 4 wherein said second sender means includes a plurality of output means each operable when enabled to provide a pulse indicative of a condition to be transmitted to said second receiver means, and enabling means for enabling each of said output means in a predetermined sequence.

6. A data transmission system as set forth in claim 5 wherein said enabling means includes counter means, clock pulse gating means operable when enabled to respond to clock pulses provided by said first receiver means to provide pulses to said counter means to enable said counter means to provide a plurality of sets of binary coded signals at outputs thereof, and decoder means responsive to the sets of outputs provided by said counter means to provide a plurality of outputs for enabling each of said output means in sequence to enable the generation of said further pulse train.

7. A data transmission system as set forth in claim 6 wherein said sequencing means of said first receiver means includes clock pulse counting means for counting the clock pulses provided by said clock pulse generating means and for enabling said clock pulse gating means after a predetermined number of clock pulses have been counted by said clock pulse counting means.

8. A data transmission system as set forth in claim 6 which includes means controlled by said clock pulse gating means whenever said clock pulse gating means is enabled to inhibit said first receiver means whenever said second sender means is transmitting.

9. A data transmission system as set forth in claim 4 where said second sender means is operable to generate a further start pulse for transmission to said second receiver means, said further clock pulse generating means including start pulse sensing means responsive to each start pulse provided by said second sender means to enable said clock pulse generating means means to provide a plurality of clock pulses for synchronizing the operation of said second receiver means.

10. A data transmission system as set forth in claim 4, wherein said first receiver means includes series-to-parallel converter means for receiving said data pulses, and wherein said sequencing means of said first receiver means includes clock pulse counting means for counting the clock pulses provided by said clock pulse generating means and decoding means responsive to outputs of said clock pulse counting means to provide an output after a predetermined number of clock pulses have been counted by said clock pulse counting means for effecting the transfer of said data pulses from said converter means to said data storage means.

11. A data transmission system as set forth in claim 10 wherein said second receiver means includes input means for receiving said further data pulse train, said input means including bistable circuit means for extending said data pulses to said shift register means, said bistable circuit means having an enabling input connected to an output of said first sender means to enable said second receiver means to be inhibited by said first sender means whenever said first sender means is transmitting data.

12. In a multiplexed data transmission system for permitting bidirectional transmission of data over a transmission line between first and second locations, first sender means at said first location having means for generating a serial pulse train including a start pulse and a plurality of data pulses followed by a stop pulse for transmission to said second location over said transmission line, first receiver means at said second location including pulse storage means and synchronizing means for providing pulses for effecting the storage of said data pulses in said pulse storage means, second sender means at said second location including data means operable when enabled to generate a further serial pulse train including further data pulses, and enabling means responsive to pulses provided by said synchronizing means after all of said data pulses have been stored in said pulse storage means and while said stop pulse is being generated to enable said data means to effect transmission of said further serial pulse train over transmission line from said second location to a second receiver means at said first location.

* * * * *

UNITED STATES PATENT OFFICE
CERTIFICATE OF CORRECTION

PATENT NO. : 4,017,683
DATED : April 12, 1977
INVENTOR(S) : Carl N. Pederson and Peter G. Angelopoulos It is certified that error appears in the above-identified patent and that said Letters Patent are hereby corrected as shown below:

Add Claim 13 as follows:

-- A data transmission system as set forth in Claim 2 wherein said inhibit means is operable to inhibit said second receiver means whenever said first sender means is transmitting and wherein said second sender means includes means for inhibiting said first receiver means whenever said second sender means is transmitting. --

On the title page below the Abstract, "12 Claims" should read -- 13 Claims --.

Signed and Sealed this twenty-sixth Day of July 1977

[SEAL]

Attest:

RUTH C. MASON
Attesting Officer

C. MARSHALL DANN
Commissioner of Patents and Trademarks